United States Patent
Sosnin et al.

(10) Patent No.: US 12,126,478 B2
(45) Date of Patent: Oct. 22, 2024

(54) METHOD AND SYSTEM FOR DL PRS TRANSMISSION FOR ACCURATE RAT-DEPENDENT NR POSITIONING

(71) Applicant: Apple Inc., Cupertino, CA (US)

(72) Inventors: Sergey Sosnin, Zavolzhie (RU); Alexey Khoryaev, Nizhny Novgorod (RU); Mikhail Shilov, Nizhny Novgorod (RU); Sergey Panteleev, Nizhny Novgorod (RU); Seunghee Han, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/865,220

(22) Filed: May 1, 2020

(65) Prior Publication Data

US 2021/0076359 A1 Mar. 11, 2021

Related U.S. Application Data

(60) Provisional application No. 62/842,281, filed on May 2, 2019.

(51) Int. Cl.
*H04W 72/23* (2023.01)
*H04L 5/00* (2006.01)
(Continued)

(52) U.S. Cl.
CPC ........ *H04L 27/2613* (2013.01); *H04L 5/0048* (2013.01); *H04W 72/23* (2023.01);
(Continued)

(58) Field of Classification Search
CPC ........... H04W 72/042; H04W 72/0493; H04W 72/08; H04W 72/10; H04L 27/26132;
(Continued)

(56) References Cited

U.S. PATENT DOCUMENTS

2015/0270936 A1 9/2015 Han et al.
2017/0331670 A1 11/2017 Parkvall et al.
(Continued)

FOREIGN PATENT DOCUMENTS

| CN | 109155983 A | 1/2019 |
| WO | 2017029213 A1 | 2/2017 |
| WO | 2017200708 A1 | 11/2017 |

OTHER PUBLICATIONS

Intel Corporation, Downlink and Uplink Reference Signals for NR Positioning, 3GPP TSG RAN WG1 Meeting #96bis, Xi'an, China, Apr. 8-12, 2019, R1-1904320. (Year: 2019).*
(Continued)

*Primary Examiner* — Shailendra Kumar
(74) *Attorney, Agent, or Firm* — Womble Bond Dickinson (US) LLP

(57) ABSTRACT

A method and apparatus of a device that performs a new radio (NR) downlink (DL) positioning reference signal (PRS) resource scheduling is described. In an exemplary embodiment, the device configures at least one of a NR DL PRS Resource Pool, a NR DL PRS Resource Set, a NR DL PRS Resource, and a muting pattern. In addition, the configured NR DL PRS Resource Set may be assigned to a separate Transmission Reception Point (TRP). Furthermore, a list of configured NR DL PRS Resource Sets can be assigned to a separate TRP. The assigned NR DL PRS Resource Set may include PRS Resources with different spatial filters. In addition, the assigned NR DL PRS Resource Set can include PRS Resources with the same spatial filter.

22 Claims, 19 Drawing Sheets

Schematic representation of scheduling procedure for DL PRS

(51) Int. Cl.
  *H04L 27/26* (2006.01)
  *H04W 72/53* (2023.01)
  *H04W 72/54* (2023.01)
  *H04W 72/56* (2023.01)

(52) U.S. Cl.
  CPC ........... *H04W 72/53* (2023.01); *H04W 72/54* (2023.01); *H04W 72/56* (2023.01); *H04L 27/26132* (2021.01)

(58) Field of Classification Search
  CPC ..... H04L 5/001; H04L 5/0023; H04L 5/0032; H04L 5/0048; H04L 5/0073; H04L 5/0094; H04L 27/2613; G01S 1/0428; G01S 5/0226; G01S 5/0236; G01S 19/42
  See application file for complete search history.

(56) References Cited

U.S. PATENT DOCUMENTS

2017/0339658 A1    11/2017  Wang et al.
2020/0225309 A1*   7/2020   Manolakos ........... H04W 64/00
2021/0297215 A1*   9/2021   Da ................... H04W 72/0446

OTHER PUBLICATIONS

Intel Corporation, Offline Discussion Outcome on DL Reference Signals for NR Positioning, 3GPP TSG RAN WG1 Meeting #96bis, Xi'an, China, Apr. 8-12, 2019, R1-1905847 (Year: 2019).*
Huawei, HiSilicon, Considerations on OTDOA in NR, 3GPP TSG RAN WG1 Meeting #96bis, Xi'an, China, Apr. 8-12, 2019, R2-1904100 (Year: 2019).*
LG Electronics, Discussions on DL only based Positioning, 3GPP TSG RAN WG1 Ad-Hoc Meeting 1901, Taipei, Taiwan, Jan. 21-25, 2019, R1-1900629. (Year: 2019).*
Huawei, Remaining issues on DL based positioning, 3GPP TSG RAN WG1 Meeting #96, Athens, Greece, Feb. 25-Mar. 1, 2019, R1-1901574 (Year: 2019).*
Intel Corporation: 11 Intel Corporation: Downlink and Uplink Reference Signals for NR-Positioning 11 , 3GPP Draft; RI-1904320 Intel NRPOS DLRS, 3rd Generation Partnership . Project (3GPP), Lucioles; F-06921 Sophia-Antipolis Cedex; France, vol. RAN WGI, No. Xi 'an, China; Apr. 8, 2019 Apr. 12, 2019 Apr. 3, 2019 (Apr. 3, 2019), XP051707190, Retrieved from the Internet:URL:http://www.3gpp.org/ftp/tsg%5Fran/WGI%5FRL1/TSGR1%5F96b/Docs/R1%2D1904320%2Ezip [retrieved on—Apr. 3, 2019] paragraph [2 .1.1]—paragraph [2.1.3].
Intel Corporation: "Offline Discussion Outcome on DL Reference Signals for NR Positioning", 3GPP Draft; RI-1905847—Intel—Offline Summary on DL PRS, 3rd Generation Partnership Project (3GPP), Mobile Competence Centre : 650, Route Des Lucioles ; F-06921 Sophia-Antipolis Cedex ; France vol. RAN WGI, No. Xi 'an, China; Apr. 8, 2019-Apr. 12, 2019 Apr. 15, 2019 (Apr. 15, 2019), XP051707893, Retrieved from the Internet: URL:http://www.3gpp.org/ftp/tsg%5Fran/WGI%5FRL1/TSGR1%5F96b/Docs/R1%2DI905847%2Ezip [retrieved on Apr. 15, 2019] paragraph [02.2].
LG Electronics: "Discussions on DL only based Positioning", 3GPP Draft; RI-1900629 Discussion on DL Only Based Positioning, 3rd Generation Partnership Project (3GPP), Mobile Competence Centre ; 650, Route Des Lucioles ; F-06921 Sophia-Antipolis Cedex ; France vol. RAN WGI, No. Taipei, Taiwan; Jan. 21, 2019-Jan. 25, 2019 Jan. 12, 2019 (Jan. 12, 2019). XP051576170. Retrieved from the Internet: URL:http://www.3gpp.org/ftp/tsg%5Fran/WGI%5FRL1/TSGR1%5FAH/NR%5FAH%5F1901/Docs/R1%2D 1900629%2Ezip [retrieved on Jan. 12, 2019] paragraph [0003].
Huawei et al. "Cons i de rations on OTDOA in NR", 3GPP Draft; R2-1904100 Consideration on OTDOA in NR, 3rd Generation Partnership Project (3GPP), Mobile Competence Centre ; 650, Route Des Lucioles ; F-06921 Sophia-Antipolis Cedex ; Francevol. RAN WG2, No. Xi 'an, China; Apr. 8, 2019-Apr. 12, 2019 Apr. 6, 2019 (Apr. 6, 2019), XP051701414, Retrieved from the Internet: URL:http://www.3gpp.org/ftp/Meetings%5F3GPP%5FSYNC/RAN2/Docs/R2%2D1904100%2Ezip [retrieved on Apr. 6, 2019] p. 2.
Huawei: Remaining issues on DL based positioning11, 3GPP Draft, RI-1901574, 3rd Generation Partnership Project (3GPP), Mobile Competence Centre ; 650, Route Des Lucioles ; F-06921 Sophia-Antipolis Cedex , France vol. RAN WGI, No. Athens, Greece; Feb. 25, 2019-Mar. 1, 2019 Feb. 15, 2019 (Feb. 15, 2019), XP051599271, Retrieved from the Internet: URL:http://www.3gpp.org/ftp/tsg%5Fran/WG1%5FRL1/TSGR1%5F96/Docs/R1%2D1901574%2Ezip [retrieved on Feb. 15, 2019]paragraph [02. 2].
ERICSSON: Text Proposal and on Further Discussion enhancements for OTDOA II. 3GPP Draft; RI-153744, 3rd Generation Partnership Project (3GPP). Mobile Competence Centre ; 650, Route Des Lucio Les • F-06921 Sophia-Antipolis Cedex ; France vol. RAN WGI, No. Beijing, China; Aug. 24, 2015-Aug. 28, 2015 Aug. 23, 2015 (Aug. 23, 2015), XP051001192, Retrieved from the Internet: URL:http://www.3gpp.org/ftp Meetings_3GPP_ Sync/ Ran 1/Docs/[retrieved on Aug. 23, 2015] the whole document.
QUALCOMM Incorporated: 11 Introduction of PRS based Terrestrial Beacon System, 3GPP Draft; RI-164450 (PRS Based Terrestrial Beacon System), 3rd Generation Partnership Project (3GPP), Mobile Competence Centre ; 650, Route Des Lucioles ; F-06921 Sophia-Antipolis Cedex ; France vol. RAN WGI, No. Nanjing, China; May 23, 2016 May 27, 2016 May 14 2016 (May 14, 2016), XP051096442, Retrieved from the Internet:URL:http://www.3gpp.org/ftp/tsg_ran/WG1_RL 1/TSGRI 85/Docs/ [retrieved on May 14, 2016] I the whole document.
113rd Generation Partnership Project, Technical Specification Group Radio Access Network; Study on indoor positioning enhancements for UTRA and LTE (Release 13) II 3GPP Draft; DRAFT37857-D10, 3rd Generation Partnership Project (3GPP), Mobile Competence Centre ; 650, Route Des Lucio Les ; F-06921 Sophia-Antipolis Ced Ex ; France Dec. 15, 2015 (Dec. 15, 2015), XP051063636, Retrieved from the Internet: URL:http://www.3gpp.org/ftp/tsg_ran/WG1_RL 1/DRAFT / [retrieved on Dec. 15, 2015].
Sven Fischer: "Observed Time Difference of Arrival (OTDA) Positioning in 3PP Lte", Jan. 1, 2014 (Jan. 1, 2014), XP55284784, Retrieved from the internet: URL:http://www.terranautx.com/s/Qualcomm-0 TDOA-positioning-in-LTE-June-2014.pdf paragraph [0005] paragraph [08. 5].
International Search Report and Written Opinion on the Patentability of Application No. PCT/US2020/031349, Mailed Aug. 31, 2020, 17 pages.
International Search Report and Written Opinion on the Patentability of Application No. PCT/US2017/029017, Mailed on Feb. 8, 2017, 4 pages.
International Preliminary Report and Written Opinion on the Patentability of Application No. PCT/IB2020/001151 Mailed Sep. 1, 2022, 10 pages.
International Search Report and Written Opinion on the Patentability of Application No. PCT/IB2020/002251 Mailed Sep. 26, 2022, 18 pages.
Iintel Corporation: "Downlink and Uplink Reference Signals for NR Positioning", 3GPP Draft; RI-1904320 Intel—NRPOS_DLRS, 3rd Generation Partnership Project (3GPP), Mobile Competence Centre, vol. RAN WGI, No. Xi'an, China; Apr. 8, 2019-Apr. 12, 2019 Apr. 3, 2019 (Apr. 3, 2019).
Intel Corporation: "Offline Discussion Outcome on DL Reference Signals for NR Positioning", 3GPP Draft; RI-1905847—Intel—Offline Summary on DL PRS, 3rd Generation Partnership Project (3GPP), Mobile Competence Centre, vol. RAN WGI, No. Xi'an, China•; Apr. 8, 2019-Apr. 12, 2019 Apr. 15, 2019 (Apr. 15, 2019).
LG Electronics: "Discussions on DL only based Positioning", 3GPP Draft; RI-1900629 Discussion on DL Only Based Positioning, 3rd Generation Partnership Project (3GPP), Mobile Competence Centre, vol. RAN WGI, No. Taipei, Taiwan; Jan. 21, 2019-Jan. 25, 2019 Jan. 12, 2019 (Jan. 12, 2019).
Huawei et al: "Considerations on OTDOA in NR", 3GPP Draft; R2-1904100 Consideration on OTDOA in NR, 3rd Generation Partnership Project (3GPP), Mobile Competence Centre, vol. RAN WG2, No. Xi'an, China; Apr. 8, 2019-Apr. 12, 2019 Apr. 6, 2019 (Apr. 6, 2019).

(56) References Cited

OTHER PUBLICATIONS

Huawei: "Remaining issues on DL based positioning", 3GPP Draft; RI-1901574? 3rd Generation Partnership Project (3GPP), Mobile Competence Centre, vol. RAN WGI, No. Athens, Greece; Feb. 25, 2019-Mar. 1, 2019 Feb. 15, 2019 (Feb. 15, 2019).
International Preliminary Report and Written Opinion on the Patentability of Application No. PCT/IB2020/001151 Mailed Sep. 15, 2022, 10 pages.
International Preliminary Report and Written Opinion on the Patentability of Application No. PCT/IB2020/001151 Mailed Oct. 6, 2022, 10 pages.
International Search Report and Written Opinion received for PCT Patent Application No. PCT/IB2020/001151, mailed on Sep. 26, 2022, 13 pages.
Office Action received for Chinese Patent Application No. 202080048497.8, mailed on Feb. 3, 2024, 13 pages (5 pages of English Translation and 8 pages of Original Document).

* cited by examiner

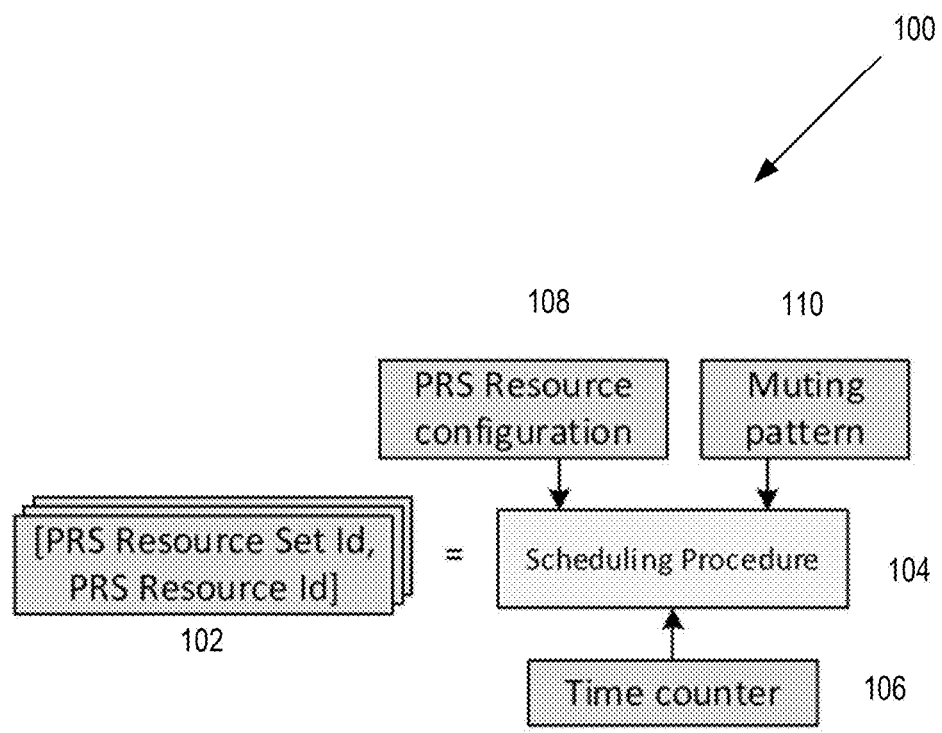
Figure 1A  Schematic representation of scheduling procedure for DL PRS

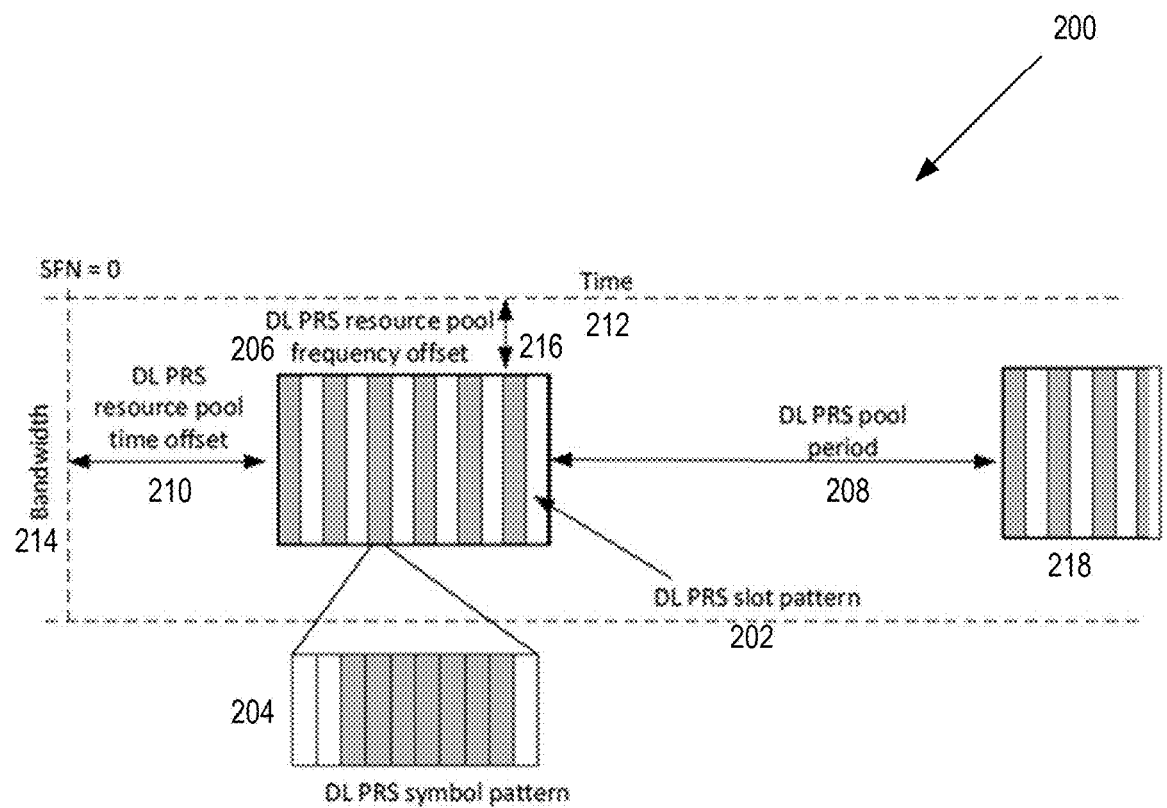
Figure 2: DL PRS Pool Physical Structure

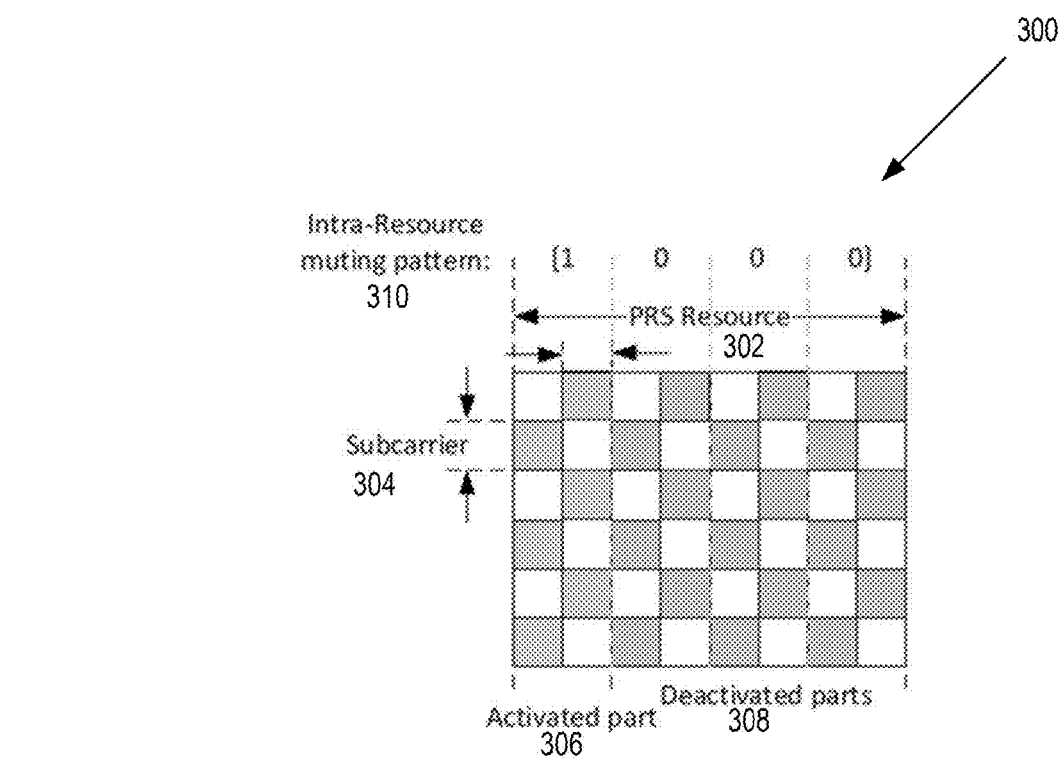
Figure 3: Example of PRS Resource activation using muting pattern approach

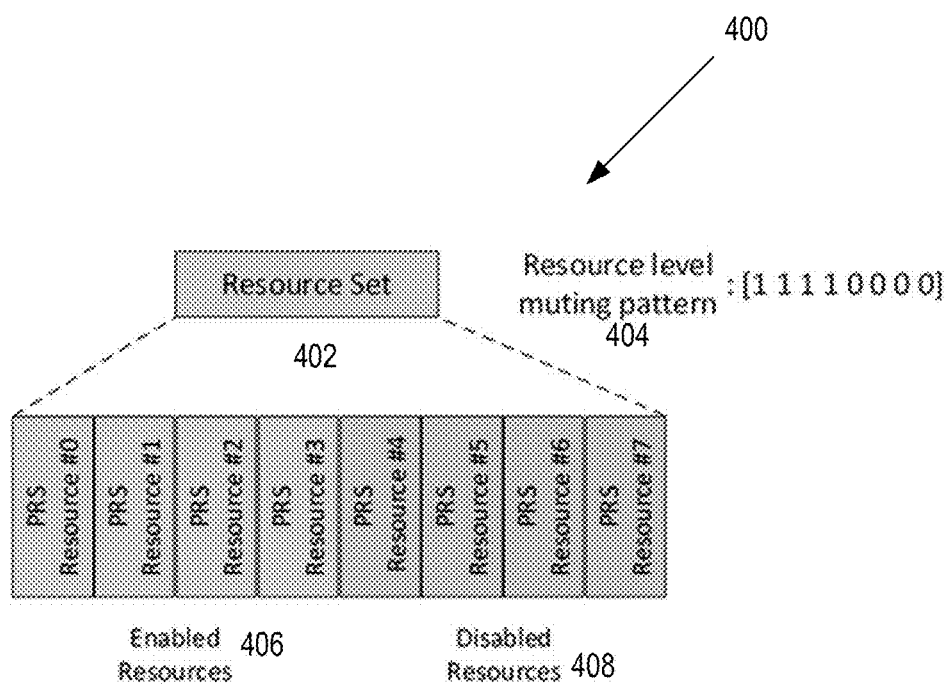
Figure 4: Example of PRS Resource activation using muting pattern approach

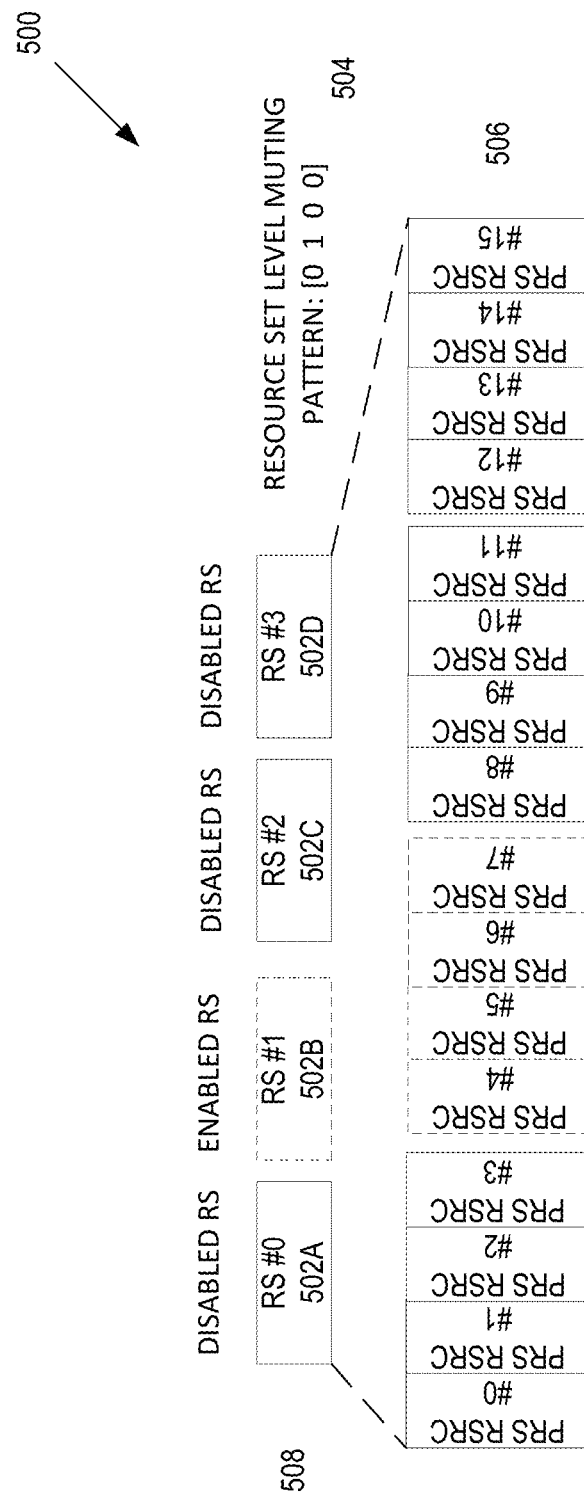
FIGURE 5: EXAMPLE OF PRS RESOURCE SETS ACTIVATION USING MUTING PATTERN APPROACH

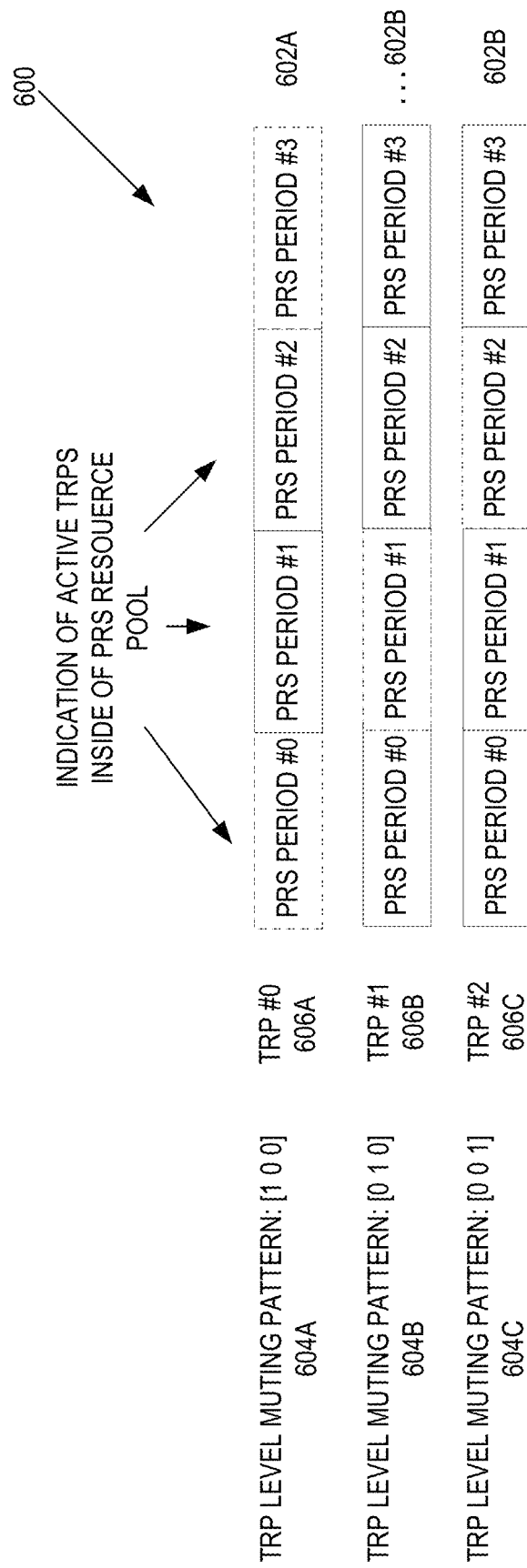
FIGURE 6: EXAMPLE OF TRP ACTIVATION USING MUTING PATTERN APPROACH

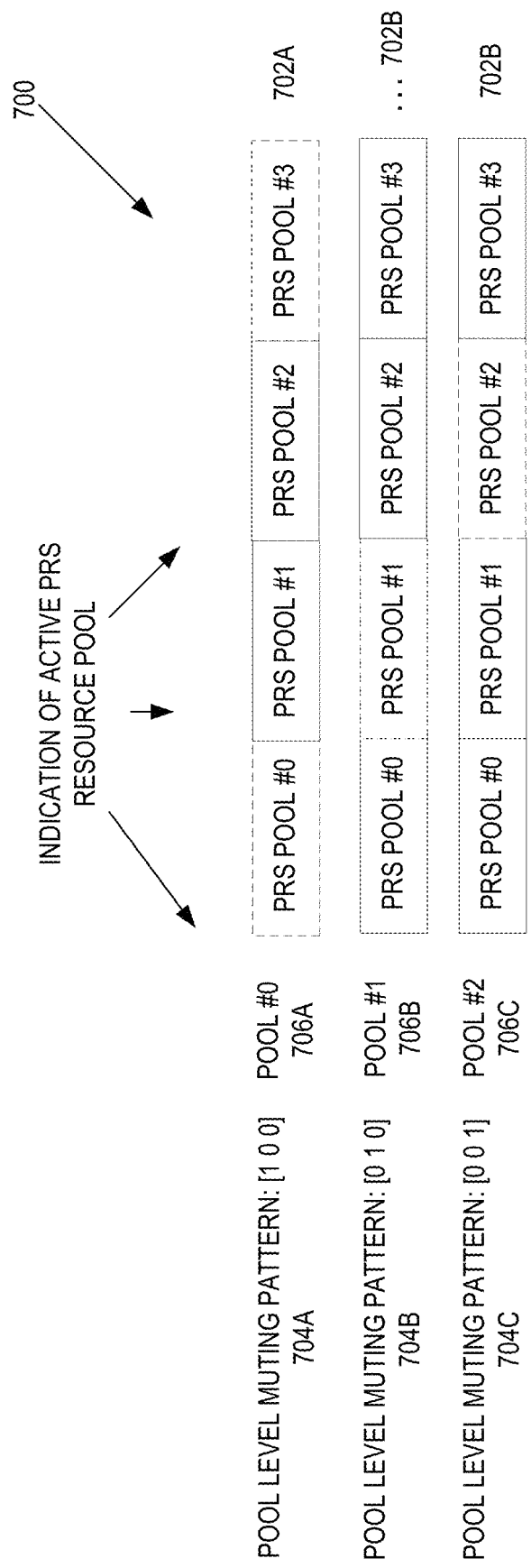
FIGURE 7: EXAMPLE OF PRS RESOURCE POOL ACTIVATION USING MUTING PATTERN APPROACH

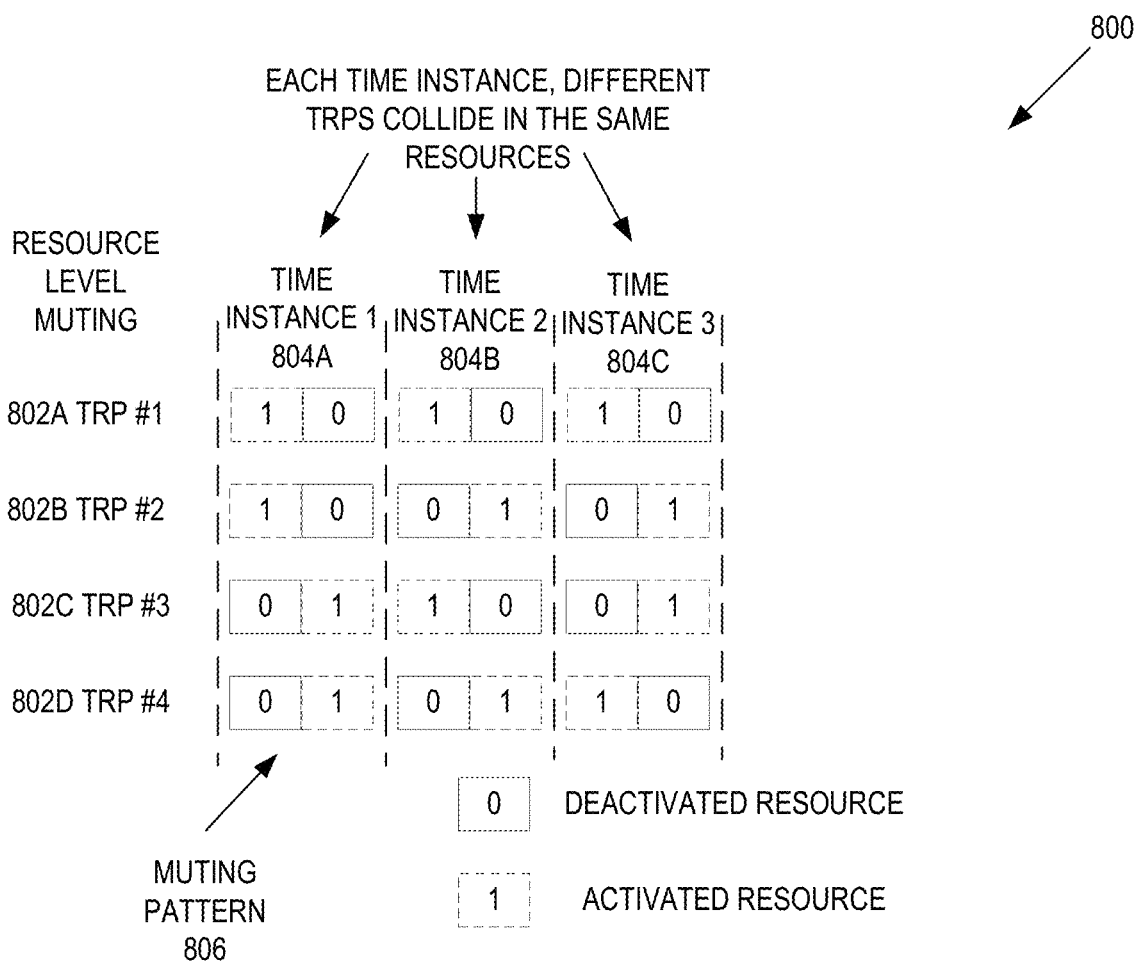
FIGURE 8: EXAMPLE OF DYNAMIC MUTING PATTERN RE-CONFIGURATION

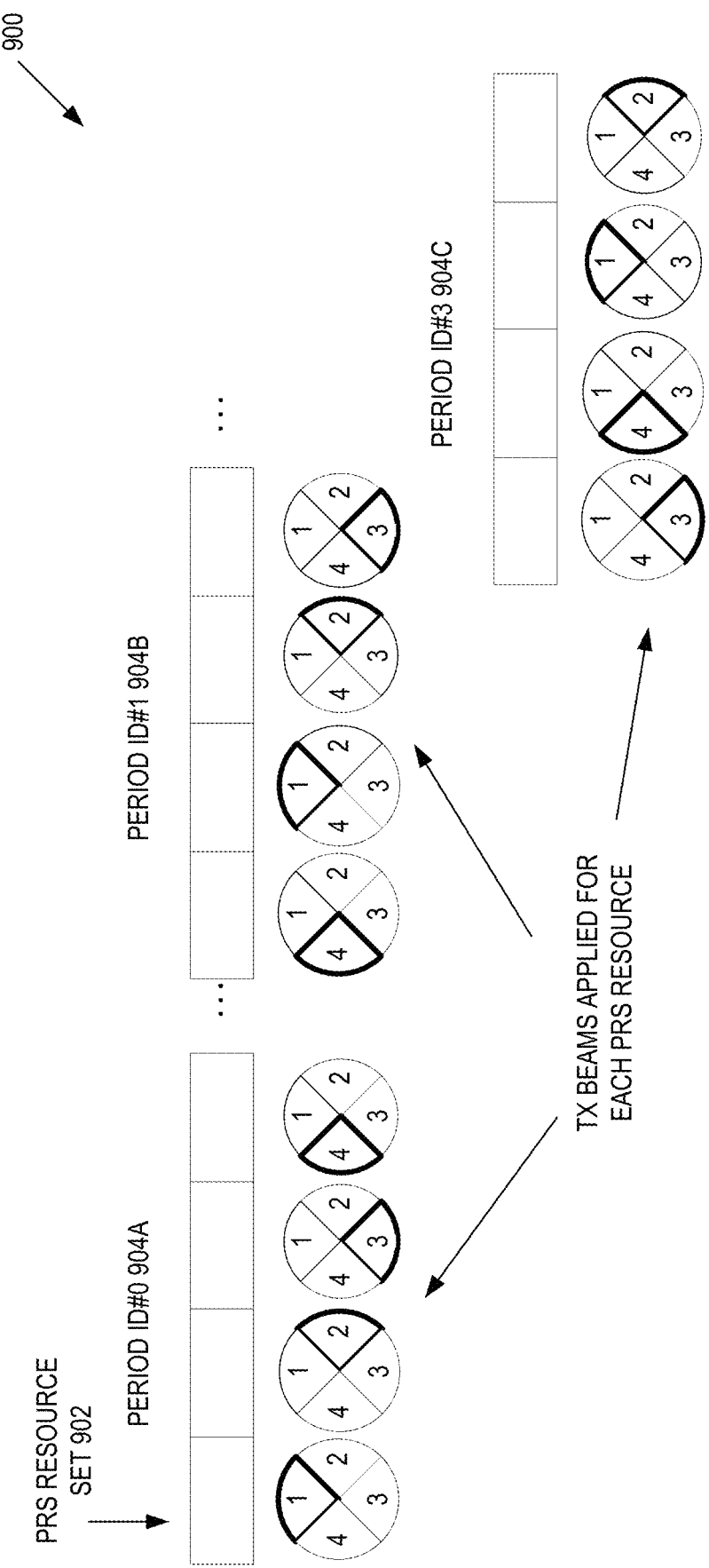
FIGURE 9: TX BEAM ROTATION ACROSS PRS RESOURCES IN PRS RESOURCE SET

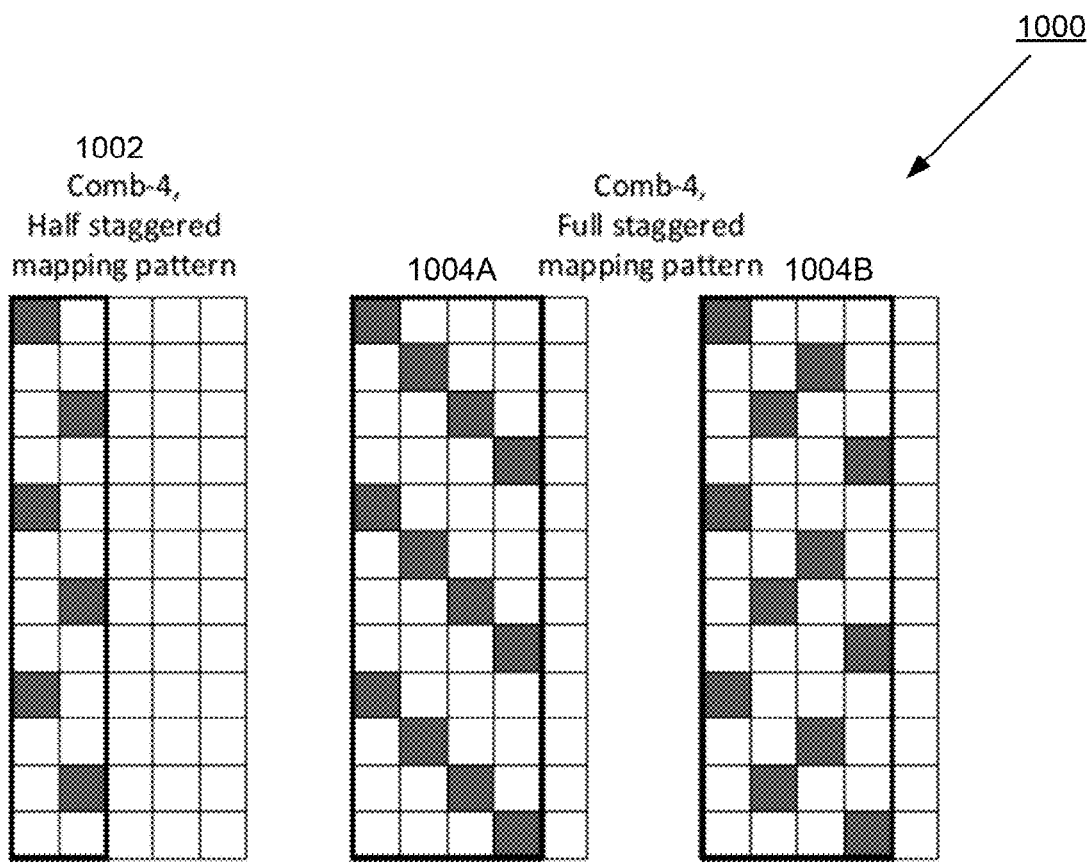
Figure 10: Example of resource element mapping pattern for PRS Resource

US 12,126,478 B2

METHOD AND SYSTEM FOR DL PRS TRANSMISSION FOR ACCURATE RAT-DEPENDENT NR POSITIONING

This application claims the benefit of priority of U.S. Provisional Patent Application No. 62/842,281, filed on May 2, 2019, which is incorporated herein by reference in its entirety to provide continuity of disclosure.

FIELD OF INVENTION

This invention relates generally to wireless technology and more particularly to a Downlink Positioning Reference Signals (DL PRS) for accurate Radio Access Technology (RAT) dependent new radio (NR) positioning.

BACKGROUND OF THE INVENTION

Modern wireless communication networks are designed to provide high quality of services consuming a minimum amount of resources. In addition, the procedures enabled in that wireless communication systems should be optimized and efficient.

Support of mechanisms for calculation of accurate user coordinate is one of the embedded component of modern wireless communication systems like 5G. The procedure of resource management should be flexible and efficient in order to maintain required QoS.

SUMMARY OF THE DESCRIPTION

A method and apparatus of a device that performs a new radio (NR) downlink (DL) positioning reference signal (PRS) resource scheduling is described. In an exemplary embodiment, the device configures at least one of a NR DL PRS Resource Pool, a NR DL PRS Resource Set, a NR DL PRS Resource, and a muting pattern. In addition, the configured NR DL PRS Resource Set may be assigned to a separate Transmission Reception Point (TRP). Furthermore, a list of configured NR DL PRS Resource Sets can be assigned to a separate TRP. The assigned NR DL PRS Resource Set may include PRS Resources with different spatial filters. In addition, the assigned NR DL PRS Resource Set can include PRS Resources with the same spatial filter.

Furthermore, the each of the assigned PRS Resource Set from a list of NR DL PRS Resource Sets may include PRS Resources with same spatial filter configuration and the spatial filter configuration between different PRS Resource Sets is different. The each of the assigned PRS Resource Set from s list of NR DL PRS Resource Sets may include PRS Resources with different spatial filter configuration and the spatial filter configuration between different PRS Resource Sets is the same. The device can further include a muting procedure that is configured per one or a combination of the following options: Intra-Resource level; PRS Resource level; PRS Resource Set level; TRP level; or PRS Resource Pool level.

In addition, the device may further include performing a muting procedure with a pattern-based mechanism for selection of active DL PRS Resources for PRS transmission. Furthermore, the NR configuration of DL PRS Resource Set are defined including a transmit beamforming configuration procedure.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 1A illustrates an example schematic representation of scheduling procedure for DL PRS according to some embodiments.

FIG. 2 illustrates an example block diagram of a DL PRS Resource Pool physical structure according to some embodiments.

FIG. 3 illustrates an example block diagram of a PRS Resource activation using multiple pattern approach according to some embodiments.

FIG. 4 illustrates an example block diagram of a PRS Resource activation using muting pattern approach to some embodiments.

FIG. 5 illustrates an example block diagram of PRS Resource Sets activation using muting pattern approach according to some embodiments.

FIG. 6 illustrates an example block diagram of PRS Resource Pool activation using muting pattern approach according to some embodiments.

FIG. 7 illustrates an example block diagram of TRP activation using muting pattern approach according to some embodiments.

FIG. 8 illustrates an example block diagram of dynamic muting pattern re-configuration according to some embodiments.

FIG. 9 illustrates an example block diagram of TX beam rotation across PRS Resources in a PRS Resource Set according to some embodiments.

FIG. 10 illustrates an example block diagram of resource element mapping pattern for PRS Resource according to some embodiments.

DETAILED DESCRIPTION

Figure 1B:
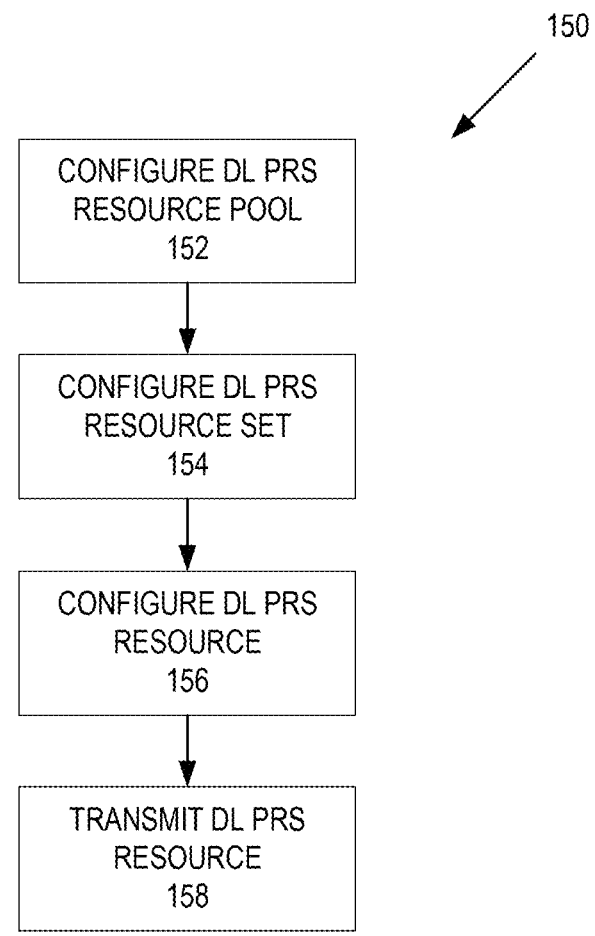
FIG. 1B is a flow diagram on one embodiment of a process to configure NR DL PRS resources.

A method and apparatus of a device that performs a new radio (NR) downlink (DL) positioning reference signal (PRS) resource scheduling is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a new radio (NR) downlink (DL) positioning reference signal (PRS) resource scheduling is described. In one embodiment, modern wireless communication networks are designed to provide high quality of services consuming minimum amount of resources. In addition, the procedures enabled in that wireless communication systems can be optimized and efficient. Support of mechanisms for calculation of an accurate user coordinate is one of the embedded component of modern wireless communication systems like 5G. The procedure of resource management should be flexible and efficient in order to maintain required QoS.

Described below is a mechanism for flexible and efficient transmission scheduling procedure for Downlink Positioning Reference Signals (DL PRS) on a Transmission Reception Point (TRP) side. In one embodiment, this can ensure soft reuse and resource re-selection are described. Provided design of resource element mapping along with scheduling procedure and sequence generation are designed to optimize receiver complexity for Positioning Reference Signal (PRS) detection and fine positioning estimation.

In another embodiment, a mechanism for flexible and efficient transmission scheduling procedure for DL PRS transmission is described. In this embodiment, a scheme for congestion control and resource re-selection is also described. The concept of a muting procedure is provided along with different muting levels and flexible muting pattern re-configuration mechanisms.

Various embodiments discussed below can illustrate additional aspects for DL PRS resource configuration and provide mechanisms for New Radio (N)R DL PRS transmission scheduling.

FIG. 1A illustrates an example schematic representation of scheduling procedure for DL PRS according to some embodiments. In one embodiment, one of the actions of a DL PRS scheduling procedure is an assignment of Resource Set ID and Resource ID combinations and corresponding configurations to a TRP for DL PRS transmission. In this embodiment, corresponding configurations to a TRP for DL PRS transmission are at each time instance (DL PRS transmission period), using defined DL PRS Resource configuration, muting procedure, and/or time counters (e.g. SFN counter).

In one embodiment, a list of scheduled [Resource Set ID, Resource ID] is a function of (DL PRS Resource configuration, Muting operation, time counter). If a muting operation is disabled, a TRP does not change the resources with active DL PRS transmission across different periods and transmission scheduling becomes predefined, otherwise DL PRS scheduling is randomized.

In FIG. 1A, the schematic representation includes a scheduling procedure 104 that produces a tuple 102 that includes a PRS Resource Set identifier and a PRS Resource identifier. In one embodiment, the scheduling procedure 102 takes as an input of a PRS Resource configuration 108, muting pattern 110, and a time counter 106. In one embodiment, the PRS Resource Set identifier is an identifier for a PRS Resource Set and the PRS Resource identifier is an identifier for a particular PRS Resource within that resource set. In addition, the PRS Resource configuration 108 is a configuration of a PRS Resource that can include fields for the resource element mapping pattern and/or a PRS sequence. Furthermore, the muting pattern 110 controls a DL PRS transmission on a given DL PRS Resource or DL PRS Resource Set. In addition, the time counter 106 is a counter used to indicate a start of a time period.

As illustrated below, the mechanism of DL PRS scheduling and muting procedure for achieving flexible and robust positioning operation in the NR systems is described. In addition, different methods of TRP configuration can be used with DL PRS Resources and provide mechanism of randomized muting based on pre-configured set of patterns.

In one embodiment, the configuration mechanism of NR DL PRS resources configuration includes following stages: (1) DL PRS Resource Pool configuration; (2) DL PRS Resource Set configuration; and (3) DL PRS Resource configuration. FIG. 1B is a flow diagram on one embodiment of a process 150 to configure NR DL PRS resources. In FIG. 1B, process 150 begins by configuring a DL PRS Resource Pool at block 152. In one embodiment, a DL PRS Resource Pool is a periodically repeated amount of DL PRS Resources representing the dedicated time-frequency resource grid for DL PRS transmissions. In one embodiment, process 150 configures the DL PRS Resource Pool by determining values for a DL PRC Pool identifier (ID), a DL PRS Pool Bandwidth and Offset, a DL PRS Pool Periodicity and Time Offset, a slot pattern, a number of slot repetitions, and a start symbol and end symbol (or number of symbols) within a slot for DL PRS transmission. Configuring the DL PRS Resource Pool is further described in FIG. 2 below.

At block 154, process 150 configures the DL PRS Resource Set. In one embodiment, a DL PRS Resource Set is a list of DL PRS Resource Sets with common parameters. The aggregation of DL PRS Sets in Resource Pool is convenient from the perspective of localized in time transmission of the DL PRS signals. In one embodiment, process 150 configures the DL PRS Resource Set by determining parameters for a Cell ID, a PRS ID, a DL PRS Resource Set ID, a Time Offset of DL PRS Resource Set, a list of DL PRS Resource IDs, a Spatial filter and/or Tx port information, and a Resource level muting pattern. Configuring the DL PRS Resource Set is further described below.

Process 150 configures a DL PRS Resource at block 156. In one embodiment, a DL PRS Resource indicates actual time-frequency allocation (resource elements) for transmission of DL PRS from a given transmission point with the fixed spatial filter. In one embodiment, configuring the DL PRS Resource includes determining parameters for a DL PRS Resource ID, a Comb-N Resource Element Pattern, a Frequency vShift, a Time offset of DL PRS Resource, a Number of symbols per DL PRS Resource; a number of TX ports, a DL PRS Resource Sequence ID, and a Quasi-Collocation Information. Configuring a DL PRS Resource is further described below. At block 158, process 150 transmits the DL PRS Resource using the configuration of the DL PRS Resource Pool, the DL PRS Resource Set, and the DL PRS Resource.

FIG. 2 illustrates an example of DL PRS Resource Pool configuration. In one embodiment, the DL PRS Resource Pool configuration includes at least the following attributes: a DL PRC Pool identifier (ID); a DL PRS Pool Bandwidth and Offset; a DL PRS Pool Periodicity and Time Offset; slot pattern; number of slot repetitions; and a start symbol and end symbol (or number of symbols) within a slot for DL PRS transmission. In this embodiment, the DL PRS Pool ID identifies the DRS Pool for this DL PRS transmission. If multiple DL PRS Pools are defined, the ID can differentiate different pools. The DL PRS Pool Bandwidth and Offset indicates the bandwidth of the dedicated grid for allocation of DL PRS resources and offset in frequency with respect to Point A of a given carrier. For simplicity, and in one embodiment, the DL PRS Resources within a Pool have the same bandwidth (or alternatively, they can different bandwidths, or a combination thereof). The DL PRS Pool Periodicity and Time Offset, where the periodicity can define a time interval between two consecutive occasions of DL PRS Pool and a time offset indicates starting slot with respect to a System Frame Number (SFN)=0. The Slot Pattern indicates which slots are configured and/or available for DL PRS transmission within a given DL PRS Resource Pool occasion. In one embodiment, a Slot pattern may be needed to allocate non-consecutive slots for DL PRS transmission. This can be defined with respect to the slot indicated by (Periodicity and Offset). The Number of slot pattern repetitions indicates the number of slot pattern that are repeated. The start symbol and end symbol (or number of symbols) within a slot for DL PRS transmission and can indicate consecutive set of symbols inside the slot for DL PRS transmission on a given DL PRS resource.

As per above, a NR DL PRS resources configuration includes a DL PRS Resource Set. In one embodiment, the DL PRS Resource Pool is a list of DL PRS Resource Sets with common parameters. The aggregation of DL PRS Sets in Resource Pool is convenient from the perspective of localized in time transmission of the DL PRS signals. Each DL PRS Resource Sets includes at least the following attributes: a Cell ID; a PRS ID; a DL PRS Resource Set ID; a Time Offset of DL PRS Resource Set; a list of DL PRS Resource IDs; a Spatial filter and/or Tx port information; and a Resource level muting pattern; and/or a combination thereof. In one embodiment, the Cell ID indicates to which cell the configured DL PRS Resource Set belongs to. The PRS ID is a Positioning configuration parameter. In addition, the PRS ID may further be used whenever multiple PRS ID values can be assigned to a single TRP. The DL PRS Resource Set ID may uniquely identify a configured DL PRS Resource Set. The Time Offset of DL PRS Resource Set provides a time offset to the start symbol of a given DL PRS Resource Set inside of DL PRS Resource Pool. The List of DL PRS Resource IDs can uniquely identify a DL PRS Resources in a given DL PRS Resource Set. In one embodiment, the Spatial filter and/or Tx port information indicates whether the same spatial transmit (Tx) filter and antenna port is applied across all DL PRS Resources within a DL PRS Resource Set. In one embodiment, this can be used for a receive (Rx) antenna training across DL PRS Resources. The Resource level muting pattern is represented by a bitmap to switch on/off DL PRS transmission on DL PRS Resources of DL PRS Resource Set. Furthermore, this can indicate whether a given DL PRS Resource Set is used for DL PRS transmission in a given DL PRS Resource Set.

In a further embodiment, a DL PRS Resource is part of the DL PRS Resource Pool. In this embodiment, the DL PRS Resource Set is a container of DL PRS Resources. Each DL PRS Resource indicates actual time-frequency allocation (resource elements) for transmission of DL PRS from a given transmission point with the fixed spatial filter. The DL PRS Resource Set can support beamforming at gNB/TRP (e.g., different spatial filters in FR2). In one embodiment, a DL PRS Resource can include at least has the following attributes: a DL PRS Resource ID; a Comb-N Resource Element Pattern; a Frequency vShift; a Time offset of DL PRS Resource; a Number of symbols per DL PRS Resource; a number of TX ports; a DL PRS Resource Sequence ID; a Quasi-Collocation Information; and/or a combination thereof. In one embodiment, the DL PRS Resource ID is a unique ID of DL PRS Resource, which is associated with unique time/frequency resources and the beam ID. The Comb-N Resource Element Pattern can define a Comb-N resource element mapping pattern for each symbol of DL PRS Resource. The Frequency vShift can indicate a frequency shift for a Resource Element Comb Pattern for each symbol of DL PRS Resource. The Time offset of DL PRS Resource can point to the first Orthogonal Frequency Division Multiplexing (OFDM) symbol where a DL PRS Resource starts within a DL PRS Resource Set occasion. In addition, the number of symbols per DL PRS Resource can be a duration, such as a duration of a single DL PRS Resource. In one embodiment, this number of symbols can be a common parameter across DL PRS Resources of DL PRS Resource Sets or even within DL PRS Resource Pool. In addition, the number of Tx Ports can indicate a number of Tx antenna ports per DL PRS Resource (e.g., 1, 2, or another number of Tx ports). As with the number of symbols described above, the number of Tx ports can be a common parameter across DL PRS Resources of DL PRS Resource Sets or within DL PRS Resource Pool. In addition, the DL PRS Resource Sequence ID is a resource sequence identifier, which can be used to generate pseudo-random DL PRS sequence(s). The Quasi-Collocation Information (e.g., a TCI state ID) can indicate whether given DL PRS signal resource is quasi-collocated with any of reference signals.

FIG. 2 illustrates an example block diagram of a DL PRS Resource Pool physical structure 200 according to some embodiments. In FIG. 2, as illustrated in time 212 and bandwidth 214, a DL Resource Pool 206 has a frequency offset 216 and a time offset 210 from an SFN=0. Within one of the DL PRS slot patterns 202 of the DL PRS Resource Pool 206 has a DL PRS symbol pattern 204. In one embodiment, a DL PRS symbol pattern indicates which slots are configured and/or available for DL PRS transmission within a given DL PRS Resource Pool occasion. In addition, another DL PRS resource pool is offset in a time period form the DL PRS resource pool 206.

As per above, the DL PRS configuration is dependent on at least the DL PRS Resource Pool configuration, the DL PRS Resource Set configuration, and the DL PRS Resource configuration. In one embodiment, the following options should be taken into account during DL PRS resource configuration on a TRP side: Number of DL PRS Resource Sets per TRP; Spatial filter configuration per DL PRS Resource Set, and/or Spatial filter configuration per DL PRS Resource Set. For example and in one embodiment, the number of DL PRS Resource Sets per TRP could be a single DL PRS Resource Set per TRP or can be Multiple DL PRS Resource Sets per TRP. In a further embodiment, the spatial filter configuration per DL PRS Resource Set can have different spatial filters are used across DL PRS Resources inside DL PRS Resource Set (e.g., a TX sweep). Alternatively, the same spatial filter may be used by the DL PRS Resource(s) inside DL PRS Resource Set (e.g., RX sweep). For example and in one embodiment, spatial filter configuration can change across DL PRS Resource Pool periods, such as repeated Tx beam across DL PRS Resource Pool periods or different Tx beams across DL PRS Resource Pool periods. Thus, TRP can be configured with a single or multiple DL PRS Resource Sets that may have different impact on UE behavior in terms of TX/RX beam sweeping.

In one embodiment, a single DL PRS Resource Set per TRP can be handled with a couple of different options. In one embodiment, a Tx Sweep across DL PRS Resource Pool Periods is performed, where the DL PRS Resources within a DL PRS Resource Set can be configured with the same spatial filter/Tx port. The Tx sweep can be enabled across different DL PRS Resource Pool periods, where a full set of Tx-Rx beam pairs can be collected over multiple DL PRS Resource Pool periods, assuming that receivers sweeps Rx beam across DL PRS Resources of DL PRS Resource Set.

In another embodiment, a Rx Sweep across DL PRS Resource Pool Periods is performed. In this embodiment, each DL PRS Resource inside DL PRS Resource Set is associated with different Tx beam (e.g., Tx sweep is applied inside of DL PRS Resource Set). In addition, a full set of Tx-Rx beams can be collected over multiple DL PRS Resource Pool periods, assuming that receiver sweeps Rx beams across DL PRS Resource Pool periods. In one embodiment, the DL PRS transmissions on DL PRS Resources use the same TX port across DL PRS Resource Pool Periods.

In one embodiment, Multiple DL PRS Resource Sets per TRP can be handled using a couple of different options. In one embodiment, a Tx Sweep across DL PRS Resources and Rx Sweep across DL PRS Resource Sets can be used. In this embodiment, each resource of the DL PRS Resource Set has different Tx beam, while receiver changes beam across DL PRS Resource Sets. In addition, a full set of Tx-Rx beams can be collected, within single DL PRS Resource pool period, assuming that receiver sweeps Rx beam across DL PRS Resource Sets (DL PRS Resources have the same Tx port across periods).

In another embodiment, a Tx Sweep across DL PRS Resource Sets and Rx Sweep across DL PRS Resources. In this embodiment, all DL PRS Resources within a DL PRS Resource Set are configured with the same spatial filter/Tx port. The Tx sweep is enabled across different DL PRS Resource Sets.

In one embodiment, the main difference of multiple DL PRS Resource Set configurations per TRP is that a full set of TX/RX beam pairs can be obtained within single DL PRS Resource Pool period, while multiple DL PRS Resource Pool periods may be needed in case of single set per TRP, unless RX sweeping within resource is assumed.

In a general case, a combination of TX/RX beam sweeping over Resources of DL PRS Resource Sets as well as across DL PRS Resource pool periods can be applied in practice such as using NR positioning supports configuration of multiple DL PRS Resource Sets per TRP and/or Enabling a switching procedure between different lists of configured DL PRS Resource Sets on a TRP in order to improve the DL PRS configuration flexibility and potential interference randomization.

As described above, a muting pattern can be used by the scheduling procedure to determine the PRS Resource Set ID and the PRS Resource ID. In one embodiment, the muting pattern is a pattern that can control the DL PRS transmission on a given DL PRS Resource, DL PRS Resource Set, DL PRS Resource Pool, DL PRS Resource Period, another entity, and/or a combination thereof. In this embodiment, a transmission schedule procedures and DL PRS muting mechanism is dedicated to control the amount of DL PRS transmissions and thus reuse factor in the system. In one embodiment, predefined pattern based muting mechanism can be used to enable: Predefined DL PRS Transmission Mode (Mode-1) or Randomized DL PRS Transmission Mode (Mode-2). In this embodiment, the muting mechanism can be classified based on level of resource granularity of muted PRS transmission. In general case, the following options can be identified for pattern based muting: Intra-Resource Muting; Resource Muting; TRP Muting; Resource Pool Muting; and/or a combination thereof. In one embodiment, the Intra-Resource Muting can be a muting of PRS transmissions on subset of time-frequency resources inside of DL PRS Resource. The Resource Muting can be a muting of PRS transmissions on subset of DL PRS Resources inside of DL PRS Resource Set. The Resource Set Muting can be a Muting of PRS transmissions on subset of DL PRS Resource Sets within DL PRS Resource Pool instance. The TRP Muting can be a muting of dedicated TRPs configured with a DL PRS Resource Pool. Lastly, the Resource Pool Muting can be a muting of DL PRS Resource Pool configured for PRS transmission in the system. In one embodiment, the at practical value can be achieved with help of Intra-Resource, Resource, or Resource Set based muting mechanisms.

In one embodiment, a pattern approach for muting can use a configuration of bitmap pattern which includes one-to-one correspondence between DL PRS Resource/Resource Set/TRP/Pool/etc. and bit positioning inside the pattern. As it was described above, several level of muting based on pattern approach can be applied.

In one embodiment, an intra-Resource level muting can be used, which can be a mechanism of activation/deactivation of part of time/frequency resources inside the single PRS Resource. In this embodiment, the PRS Resource is divided on a four-time domain multiplexed parts and the muting pattern is capable to activate/deactivate these sub-parts independently. FIG. 3 illustrates an example block diagram of a PRS Resource activation 300 using multiple pattern approach according to some embodiments. In FIG. 3, the PRS Resource activation includes a PRS Resource 302 that includes an activated 306 and a deactivated 308 part. In one embodiment, the activated part 306 is the part of the PRS resource that is being used for the transmission, whereas the deactivated part 308 is not being used for the transmission. In one embodiment, the activated 306 and deactivated 308 parts are controlled by an Intra-Resource muting pattern 310. In this embodiment, the Intra-Resource muting pattern 310 is a sequence of bits that indicates which of the parts of the PRS Resource are being used for the transmission. For example and in one embodiment, the Intra-Resource muting pattern 310 includes the pattern [1 0 0 0], which indicates that the first part of the PRS Resource 302 is activated and the subsequent next three parts are not activated (e.g., deactivated). In one embodiment, the constituent part of the PRS Resource 302 is a subcarrier 304.

In another embodiment, a muting pattern can be applied on a PRS Resource Set level, where the muting rule is capable to activate or deactivate each PRS resource separately inside of the PRS Resource Set. FIG. 4 below illustrates an example of pattern muting on PRS Resource level. FIG. 4 illustrates an example block diagram of a PRS Resource activation using muting pattern approach to some embodiments. In FIG. 4, the resource level muting pattern is applied to a PRS resource set 402 that is a list of PRS Resources 406 and 408. In this embodiment, the resource level muting pattern is [1 1 1 1 0 0 0 0], which means the first four PRS resources in the list are enabled 406 and the next four PRS resources in the list are disabled 408.

Alternatively, and in another embodiment, each TRP can be configured with a combination of PRS Resource Sets and the muting pattern mechanism can be applied on a PRS Resource Set level as it is illustrated in FIG. 5, where the number of active Resource Sets available for DL PRS transmission for a TRP is defined but the muting pattern. FIG. 5 illustrates an example block diagram of PRS Resource Sets activation using muting pattern approach according to some embodiments. In FIG. 5, a resource set level muting pattern is applied a group of PRS Resource Sets 508. In one embodiment, the resource set level muting pattern is [0 1 0 0], which means that the first PRS Resource Set 502A is deactivated, the second PRS Resource Set 502B is activated, and the third 502C and fourth 502D PRS Resource Sets are deactivated. Based on this muting pattern, the corresponding PRS Resources are activated (PRS Resources #5-8) or deactivated (PRS Resources #1-4 and #8-15) as illustrated.

From muting point of view, and in another embodiment, the whole TRP transmission can be muted based on TRP-based muting pattern, which describes the time stamps inside single or multiples PRS Resource Pools when each TRP does not transmit positioning signals. Thus, TRPs configured with PRS resources from same PRS Resource Pool can be muted based on TRP-level muting patter approach. This type of pattern based muting can be beneficial in case of congested resource occupation rate by high number TRPs participating in positioning procedure. An example of TRP level muting based on patter is provided in FIG. 6. FIG. 6 illustrates an example block diagram of PRS Resource Pool activation using muting pattern approach according to some embodiments. In FIG. 6, different TRP-level muting patterns 604A-C are applied to different TRPs 606A-C. In one embodiment, a TRP level muting pattern 604A of [1 0 0] is applied to TRP 606A, which results in PRS Periods #0 and #3 being activated and PRS Periods #2 and 3 being deactivated. In another embodiment, a TRP level muting pattern 604B of [0 1 0] is applied to TRP 606B, which results in PRS Period #1 being activated and PRS Periods #0, 2, and 3 being deactivated. In a further embodiment, a TRP level muting pattern 604C of [0 0 1] is applied to TRP 606C, which results in PRS Period #2 being activated and PRS Periods #0, 1, and 3 being deactivated.

Additionally, and in a further embodiment, a pattern based muting can be applied on a PRS Resource Pool level. For example and in one embodiment, several PRS Resource pools are configured in the network, which can have same or different subsets of configuration parameters. Same or different set of TRPs can be configured to transmit positioning signal in these PRS Pools. In order to control the transmission activity, Pool level muting can be applied. FIG. 7 illustrates an example block diagram of TRP activation using muting pattern approach according to some embodiments. In FIG. 7, different Pool-level muting patterns 704A-C are applied to different Pools 706A-C. In one embodiment, a Pool level muting pattern 704A of [1 0 0] is applied to Pool 706A, which results in Pools #0 and #3 being activated and Pools #2 and 3 being deactivated. In another embodiment, a Pool level muting pattern 704B of [0 1 0] is applied to Pool 706B, which results in Pool #1 being activated and Pools #0, 2, and 3 being deactivated. In a further embodiment, a Pool level muting pattern 704C of [0 0 1] is applied to Pool 706C, which results in Pool #2 being activated and Pools #0, 1, and 3 being deactivated.

As described above, there can be different types of muting patterns that are used for determining the PRS Resource Set ID and the PRS Resource ID. In one embodiment, a muting pattern can be configured in the following ways: a fixed pre-configured pattern; and/or a fixed pre-configured set of patterns. In one embodiment, a fixed pre-configured pattern uses the same muting pattern is applied across different DL PRS Resource Pool periods and can be changed by a network (re)-configuration signaling. In this embodiment, resources are allocated for PRS transmission are the same across different periods that can cause constant interference between different collided TRPs. This approach can be used in congested free case. The pre-configured pattern corresponds to predefined DL PRS transmission mode.

In another embodiment, a fixed pre-configured set of patterns can use a muting pattern applied for a given DL PRS transmission period changes per DL PRS Resource Pool period by using a pre-defined rule. This provides a randomization in time of DL PRS transmissions across different resources. As an example and embodiment for predefined rule, the following mechanisms for muting pattern re-configuration can be used: a selection of a single muting pattern from a list of pre-configured muting patterns and/or a dynamic reconfiguration of single defined muting pattern based on equation/formula/rule. In one embodiment, with the help of dynamic pattern reconfiguration, a randomized DL PRS transmission mode can be supported. Dynamic reconfiguration of the pattern can control a probability of PRS transmission. It should be noted that set of patterns can be optimized to guarantee in average.

In one embodiment, in order to achieve randomization, each TRP and UE can be configured with a list or set of muting patterns associated either with DL PRS Resource Set. In addition, the selection of the actual pattern for current time stamp (e.g. DL PRS Resource Pool period) can be defined as a random selection process or selection based on counter (e.g. each time stamp TRP selects next pattern as a muting pattern for DL PRS transmission). In this embodiment, it could be noted that a configuration of the muting pattern allows to control average amount of transmissions from different TRPs on single DL PRS resource, while randomize interference on different transmission periods.

In a further embodiment, dynamic pattern re-configuration for Resource Set level muting can allow for the following types of randomization in the system between different TRPs: Spatial randomization, Time/Frequency randomization, and/or Code randomization. In this embodiment, the description of the reconfiguration rule can include the following parameters of a reconfiguration procedure type. In one embodiment, a cyclic shift of the defined pattern with minimum granularity of M, where M 1 can be used. In this embodiment, either a random offset, a predefined list of offsets, or a predefined rule for offset calculation can be used. For the predefined list of offsets, each TRP can be configured with a predefined set cyclic shifts for defined muting patter and selection is applied based time stamp (PRS period) counter. For the predefined rule for offset calculation, a pattern cyclic shift is calculated according to equation. As an example and embodiment, the following equation can be used for cyclic shift calculation: $cs=\lfloor PreiodId/N_{cs}\rfloor$, where PreiodId is a PRS period ID and $N_{CS}$ is a TRP specific parameter dedicated for cyclic shift configuration.

In another embodiment, a selection of K elements from an N-element array, where N muting pattern size and K number of non-zero elements can be used in the muting pattern. In this embodiment, a random selection of K elements inside of the N size pattern can be used or a predefined rule of selection.

FIG. 8 illustrates an example block diagram of dynamic muting pattern re-configuration according to some embodiments. In FIG. 8, an example of dynamically configured muting pattern is illustrated, where 4 TRPs 802A-D share 3 PRS Resources 804A-C, in different time instances, different combination of TRPs are collide to each other creating dynamic interference environment. In one embodiment, each of the TRPs 802A-D has a different muting patterns 806 so as to reduce interference. For example and in one embodiment, TRP 802A as a muting pattern [1 0 1 0 1 0], TRP 802B has a muting pattern of [1 0 0 1 0 1], TRP 802C has a muting pattern of [0 1 1 0 0 1], and TRP 802D has a muting pattern of [01 0 1 1 0], in this example, each time instance has a different set of colliding TRPs in the same resources.

In a further embodiment, a DL PRS beam rotation/permutation can be applied for NR Positioning. In this embodiment, an idea behind beam rotation/permutation is the change of the order of beam activation within DL PRS Resource Set (or change the order of DL PRS transmission on a given resource) across DL PRS transmission period. Beam Rotation can be applied on top of the DL PRS muting technique and randomize spatial interference even without muting. In one embodiment, at least two of the following options can be considered for Tx beam rotation procedure. In one embodiment, a Tx Sweep across DL PRS Resources inside each DL PRS Resource Set is used. In case of Tx beam sweeping inside DL PRS Resource Set, the Tx beam permutation procedure is applied similarly to each Resource Set. In another embodiment, a Tx Sweep across DL PRS Resource Sets can be used. In case of Tx beam sweeping across DL PRS Resource Sets, the Tx beam permutation procedure is applied across DL PRS Resource Sets.

For example and in one embodiment, if a DL PRS Resource Set is composed from DL PRS Resources #1, #2, #3, . . . , #N, then for a DL PRS transmission on each DL PRS Resource, the beam associated with each DL PRS Resource can be changed and/or rotated over time (e.g. at each DL PRS transmission period or some other time period). In this embodiment, a UE cannot assume that the same spatial filter is applied for DL PRS transmission on a given DL PRS Resource across different periods. The beam rotation (permutation) within DL PRS Resource Set Resources can also be DL PRS Resource Set Specific.

In one embodiment, the Beam ID (which can be also called Logical DL PRS Resource ID) is a function of at least following parameters: Physical DL PRS Resource ID; Physical DL PRS Resource Set ID; DL PRS Period; and/or a number of DL PRS Resources per Set or number of beams. For example and in one embodiment, the following equation can be used for Tx beam ID calculation:

Tx beam Id=mod(PhyResID+PeriodID·mod(PhySetID,BeamNum),BeamNum), where

PhyResID is the Physical DL PRS Resource ID;
PhySetID is the Physical DL PRS Resource Set ID
BeamNum is the Number of DL PRS Resources per Set or number of beams FIG. 9 represents the Tx beam rotation 906A-C across PRS Resources in the PRS Resource Set 902 for different PRS periods 904A-C. In FIG. 9, the PRS Resource Set 902 rotates the TX beam 906A-C for different periods 904A-C. In each period 904A-C, a different Tx beam rotation is applied. For example and in one embodiment, Tx beam 906A is 1-2-3-4 for a time period 904A. Advancing to the next time period 904B, the Tx beam 906B is rotated to 4-1-2-3. At the last time period illustrated, the Tx beam 906C is further rotated to 3-4-1-2.

In one embodiment, the following table represents an example of the Tx beam ID rotation across PRS resources inside of the PRS Resource Set during different PRS periods:

TABLE 1

Table of Tx Beam ID Rotation.

| Resource ID | Period #0 Beam ID | Period #1 Beam ID | Period #2 Beam ID | Period #3 Beam ID | Period #4 Beam ID | Period #5 Beam ID | Period #6 Beam ID | Period #7 Beam ID |
|---|---|---|---|---|---|---|---|---|
| 0 | 0 | 7 | 6 | 5 | 4 | 3 | 2 | 1 |
| 1 | 1 | 0 | 7 | 6 | 5 | 4 | 3 | 2 |
| 2 | 2 | 1 | 0 | 7 | 6 | 5 | 4 | 3 |
| 3 | 3 | 2 | 1 | 0 | 7 | 6 | 5 | 4 |
| 4 | 4 | 3 | 2 | 1 | 0 | 7 | 6 | 5 |
| 5 | 5 | 4 | 3 | 2 | 1 | 0 | 7 | 6 |
| 6 | 6 | 5 | 4 | 3 | 2 | 1 | 0 | 7 |
| 7 | 7 | 6 | 5 | 4 | 3 | 2 | 1 | 0 |

In Table 1, a rotation of a set of Tx Beam ID is illustrated. In one embodiment, a set of Tx Beam IDs from 0 to 7 is rotated over eight different periods (e.g., time periods 0 . . . 7. In each time period, the resource ID is shifted by one. For example and in one embodiment, in time period 0, the resource ID is mapped to the beam ID (0, 1, 2, 3, 4, 5, 6, 7)→(0, 1, 2, 3, 4, 5, 6, 7). In each successive time period, the beam ID in this mapping is shifted by one. For example and in one embodiment, in time period 1, the resource ID is mapped to the beam ID (0, 1, 2, 3, 4, 5, 6, 7)→(7, 0, 1, 2, 3, 4, 5, 6). This shifting can occur in each subsequent time period, so as in time period 7, the mapping of resource ID to beam ID is (0, 1, 2, 3, 4, 5, 6, 7)→(0, 1, 2, 3, 4, 5, 6, 7).

In one embodiment, a DL PRS Sequence is initialized. In this embodiment, a radio access network (RAN) agrees to reuse a pseudo-random sequence generator for DL PRS. The sequence generation initialization seed can be defined in two different options. In one embodiment, a DL PRS Seed per DL PRS Resource Set is used. In this embodiment, a Gold sequence generator is initialized with the same seed for each DL PRS Resource inside the DL PRS Resource Set (e.g., same seed per DL PRS Resource Set). This embodiment has certain benefits for DL PRS reception, given that the same sequence is generated for each DL PRS Resource inside of the DL PRS Resource Set and thus signal is repeated across DL PRS Resources. This simplifies a complexity of UE RX beam sweep across DL PRS Resources. Note, that in order to have the same repeated signal, the $c_{init}$ should not be dependent on a symbol and slot index of the resource but can be dependent on start slot index and start symbol index of DL PRS Resource Set. In addition, a vShift pattern should be the same across all symbols of different Resources.

In another embodiment, a DL PRS Seed per DL PRS Resource is used. In this embodiment, a different generator seed can be provided for each DL PRS Resource inside DL PRS Resource Set that implies simplified detection of each DL PRS Resource ID. This embodiment, however, may use more complicated reception timing estimation procedure.

For the embodiment of a same sequence generation, the $c_{init}$ value is calculated according to following formula as an example:

$$c_{init} = 2^{28} \cdot \left\lfloor \frac{N_{PRS\_ID}}{512} \right\rfloor + 2^{10} \cdot (14(n_s^\mu + 1) + \mod(l, 14) + 1) \cdot$$
$$(2 \cdot (N_{PRS_{ID}} \mod 512) + 1) + N_{PRS_{ID}} \mod 512$$

where $N_{PRS\_ID} \in \{0 \ldots 4095\}$ equals $N_{PRS\_ID}$ unless configured by higher layers, TRP specific parameter for positioning configuration, $n_s^\mu$ is a start slot index within a subframe which points to the beginning of the PRS Resource Set, and l is a PRS Resource Set ID.

For the case of different sequence generation, the $c_{init}$ value can be calculated according to following formula:

$$c_{init} = 2^{28} \cdot \left\lfloor \frac{N_{PRS\_ID}}{512} \right\rfloor +$$
$$2^{10} \cdot (14(n_s^\mu + 1) + l + 1) \cdot (2 \cdot (N_{PRS_{ID}} \mod 512) + 1) + N_{PRS_{ID}} \mod 512,$$

where $N_{PRS\_ID} \in \{0 \ldots 4095\}$ equals $N_{PRS\_ID}$ unless configured by higher layers, TRP specific parameter for positioning configuration, $n_s^\mu$ is a slot number within a subframe, and l is a symbol index inside of the slot.

In a further embodiment, a PRS Resource Element Mapping can be used. From one side, the increased comb-N factor of frequency mapping can cause an additional alias peaks that may affect the processing procedure, but from another side the increased comb-N factor of frequency mapping allows to use tighter multiplexing of different PRS Resources in frequency and apply PRS boosting on occupied resources which is efficient for coverage limited scenarios. In addition, noise on non-occupied resource elements can be filtered out. Based on observation above, a comb-$N_{comb}$ structure can be supported, in frequency for DL PRS, where $N_{comb} = \{2, 4, 6\}$.

In one embodiment, to support following relationships between comb-N frequency mapping structure and number of occupied symbols for PRS Resource configuration, a full staggered resource mapping pattern that implies each subcarrier in the allocated bandwidth is occupied by PRS can be used. In addition, a half staggered resource mapping pattern, which implies each odd or even subcarrier in the allocated bandwidth are occupied by PRS may also be used.

FIG. 10 illustrates an example block diagram of resource element mapping pattern for PRS Resource according to some embodiments. In FIG. 10, an example of full 1004A-B and half 1002 staggered resource element mapping is illustrated. In one embodiment, a maximum possible number of occupied symbols for PRS Resource could be limited with number of symbols available for PRS transmission inside of the slot e.g. if 2 symbols are allocated for CORESET, then 12 is the maximum number of OFDM symbols allocated for PRS Resource. Minimum number of symbols allocated for mapping pattern should be equal to 2. The full staggered resource element mapping in FIG. 10 is illustrated in two different patterns 1004A and 1004B.

Figure 11:
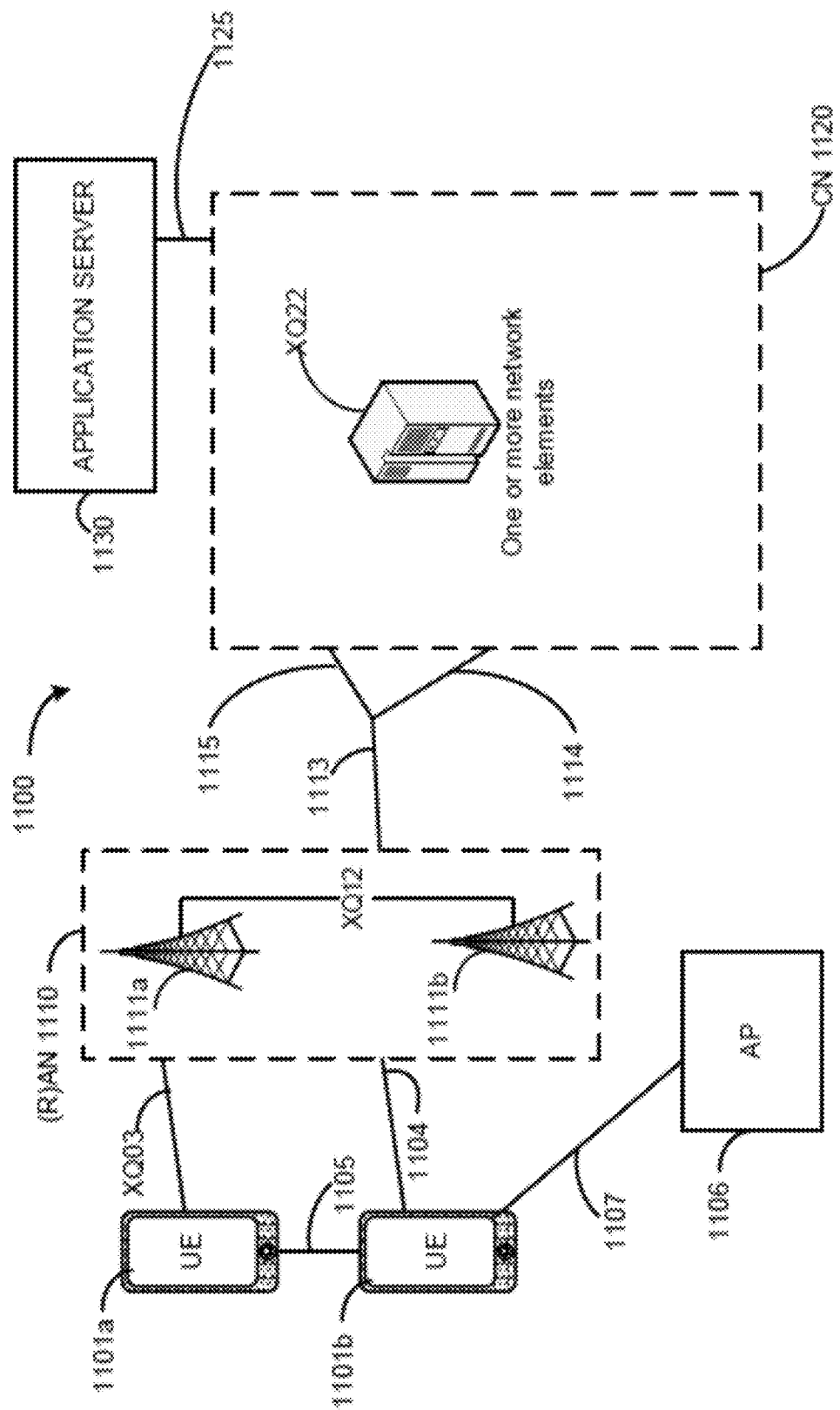
FIG. 11 illustrates an example architecture of a system of a network, in accordance with various embodiments.

FIG. 11 illustrates an example architecture of a system 1100 of a network, in accordance with various embodiments. The following description is provided for an example system 1100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 11, the system 1100 includes UE 1101a and UE 1101b (collectively referred to as "UEs 1101" or "UE 1101"). In this example, UEs 1101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 1101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 may be configured to connect, for example, communicatively couple, with an or RAN 1110. In embodiments, the RAN 1110 may be an NG RAN or a 5G RAN, an E-UTRAN, or a legacy RAN, such as a UTRAN or GERAN. As used herein, the term "NG RAN" or the like may refer to a RAN 1110 that operates in an NR or 5G system 1100, and the term "E-UTRAN" or the like may refer to a RAN 1110 that operates in an LTE or 4G system 1100. The UEs 1101 utilize connections (or channels) 1103 and 1104, respectively, each of which comprises a physical communications interface or layer (discussed in further detail below).

In this example, the connections 1103 and 1104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 1101 may directly exchange communication data via a ProSe interface 1105. The ProSe interface 1105 may alternatively be referred to as a SL interface 1105 and may comprise one or more logical channels, including but not limited to a PSCCH, a PSSCH, a PSDCH, and a PSBCH.

The UE 1101b is shown to be configured to access an AP 1106 (also referred to as "WLAN node 1106," "WLAN 1106," "WLAN Termination 1106," "WT 1106" or the like) via connection 1107. The connection 1107 can comprise a local wireless connection, such as a connection consistent with any IEEE 802.11 protocol, wherein the AP 1106 would comprise a wireless fidelity (Wi-Fi®) router. In this example, the AP 1106 is shown to be connected to the Internet without connecting to the core network of the wireless system (described in further detail below). In various embodiments, the UE 1101b, RAN 1110, and AP 1106 may be configured to utilize LWA operation and/or LWIP operation. The LWA operation may involve the UE 1101b in RRC_CONNECTED being configured by a RAN node 1111a-b to utilize radio resources of LTE and WLAN. LWIP operation may involve the UE 1101b using WLAN radio resources (e.g., connection 1107) via IPsec protocol tunneling to authenticate and encrypt packets (e.g., IP packets) sent over the connection 1107. IPsec tunneling may include encapsulating the entirety of original IP packets and adding a new packet header, thereby protecting the original header of the IP packets.

The RAN 1110 can include one or more AN nodes or RAN nodes 1111a and 1111b (collectively referred to as "RAN nodes 1111" or "RAN node 1111") that enable the connections 1103 and 1104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1111 that operates in an NR or 5G system 1100 (for example, a gNB), and the term "E-UTRAN node" or the like may refer to a RAN node 1111 that operates in an LTE or 4G system 1100 (e.g., an eNB). According to various embodiments, the RAN nodes 1111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 1111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 1111; a MAC/PHY split wherein RRC, PDCP, RLC, and MAC layers are operated by the CRAN/vBBUP and the PHY layer is operated by individual RAN nodes 1111; or a "lower PHY" split wherein RRC, PDCP, RLC, MAC layers and upper portions of the PHY layer are operated by the CRAN/vBBUP and lower portions of the PHY layer are operated by individual RAN nodes 1111. This virtualized framework allows the freed-up processor cores of the RAN nodes 1111 to perform other virtualized applications. In some implementations, an individual RAN node 1111 may represent individual gNB-DUs that are connected to a gNB-CU via individual F1 interfaces (not shown by FIG. 11). In these implementations, the gNB-DUs may include one or more remote radio heads or RFEMs (see, e.g., FIG. 14), and the gNB-CU may be operated by a server that is located in the RAN 1110 (not shown) or by a server pool in a similar manner as the CRAN/vBBUP. Additionally or alternatively, one or more of the RAN nodes 1111 may be next generation eNBs (ng-eNBs), which are RAN nodes that provide E-UTRA user plane and control plane protocol terminations toward the UEs 1101, and are connected to a 5GC (e.g., CN 130 of FIG. 13) via an NG interface (discussed infra).

In V2X scenarios one or more of the RAN nodes 1111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 1101 (vUEs 1101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 1111 can terminate the air interface protocol and can be the first point of contact for the UEs 1101. In some embodiments, any of the RAN nodes 1111 can fulfill various logical functions for the RAN 1110 including, but not limited to, radio network controller (RNC) functions such as radio bearer management, uplink and downlink dynamic radio resource management and data packet scheduling, and mobility management.

In embodiments, the UEs 1101 can be configured to communicate using OFDM communication signals with each other or with any of the RAN nodes 1111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 to the UEs 1101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 1101 and the RAN nodes 1111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1101 and the RAN nodes 1111 may operate using LAA, eLAA, and/or feLAA mechanisms. In these implementations, the UEs 1101 and the RAN nodes 1111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1101 RAN nodes 1111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 1101, AP 1106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1101. The PDCCH carries information about the transport format and resource allocations related to the PDSCH channel, among other things. It may also inform the UEs 1101 about the transport format, resource allocation, and HARQ information related to the uplink shared channel. Typically, downlink scheduling (assigning control and shared channel resource blocks to the UE 1101*b* within a cell) may be performed at any of the RAN nodes 1111 based on channel quality information fed back from any of the UEs 1101. The downlink resource assignment information may be sent on the PDCCH used for (e.g., assigned to) each of the UEs 1101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 1111 may be configured to communicate with one another via interface 1112. In embodiments where the system 1100 is an LTE system (e.g., when CN 1120 is an EPC 1220 as in FIG. 12), the interface 1112 may be an X2 interface 1112. The X2 interface may be defined between two or more RAN nodes 1111 (e.g., two or more eNBs and the like) that connect to EPC 1120, and/or between two eNBs connecting to EPC 1120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 1101 from an SeNB for user data; information of PDCP PDUs that were not delivered to a UE 1101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 1100 is a 5G or NR system (e.g., when CN 1120 is an 5GC 130 as in FIG. 13), the interface 1112 may be an Xn interface 1112. The Xn interface is defined between two or more RAN nodes 1111 (e.g., two or more gNBs and the like) that connect to 5GC 1120, between a RAN node 1111 (e.g., a gNB) connecting to 5GC 1120 and an eNB, and/or between two eNBs connecting to 5GC 1120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 1110 is shown to be communicatively coupled to a core network—in this embodiment, core network (CN) 1120. The CN 1120 may comprise a plurality of network elements 1122, which are configured to offer various data and telecommunications services to customers/subscribers (e.g., users of UEs 1101) who are connected to the CN 1120 via the RAN 1110. The components of the CN 1120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1120 may be referred to as a network slice, and a logical instantiation of a portion of the CN 1120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 1130 may be an element offering applications that use IP bearer resources with the core network (e.g., UMTS PS domain, LTE PS data services, etc.). The application server 1130 can also be configured to support one or more communication services (e.g., VoIP sessions, PTT sessions, group communication sessions, social networking services, etc.) for the UEs 1101 via the EPC 1120.

In embodiments, the CN 1120 may be a 5GC (referred to as "5GC 1120" or the like), and the RAN 1110 may be connected with the CN 1120 via an NG interface 1113. In embodiments, the NG interface 1113 may be split into two parts, an NG user plane (NG-U) interface 1114, which carries traffic data between the RAN nodes 1111 and a UPF, and the S1 control plane (NG-C) interface 1115, which is a signaling interface between the RAN nodes 1111 and AMFs. Embodiments where the CN 1120 is a 5GC 1120 are discussed in more detail with regard to FIG. 13.

In embodiments, the CN 1120 may be a 5G CN (referred to as "5GC 1120" or the like), while in other embodiments, the CN 1120 may be an EPC). Where CN 1120 is an EPC (referred to as "EPC 1120" or the like), the RAN 1110 may be connected with the CN 1120 via an S1 interface 1113. In embodiments, the S1 interface 1113 may be split into two parts, an S1 user plane (S1-U) interface 1114, which carries traffic data between the RAN nodes 1111 and the S-GW, and the S1-MME interface 1115, which is a signaling interface between the RAN nodes 1111 and MMEs.

Figure 12:
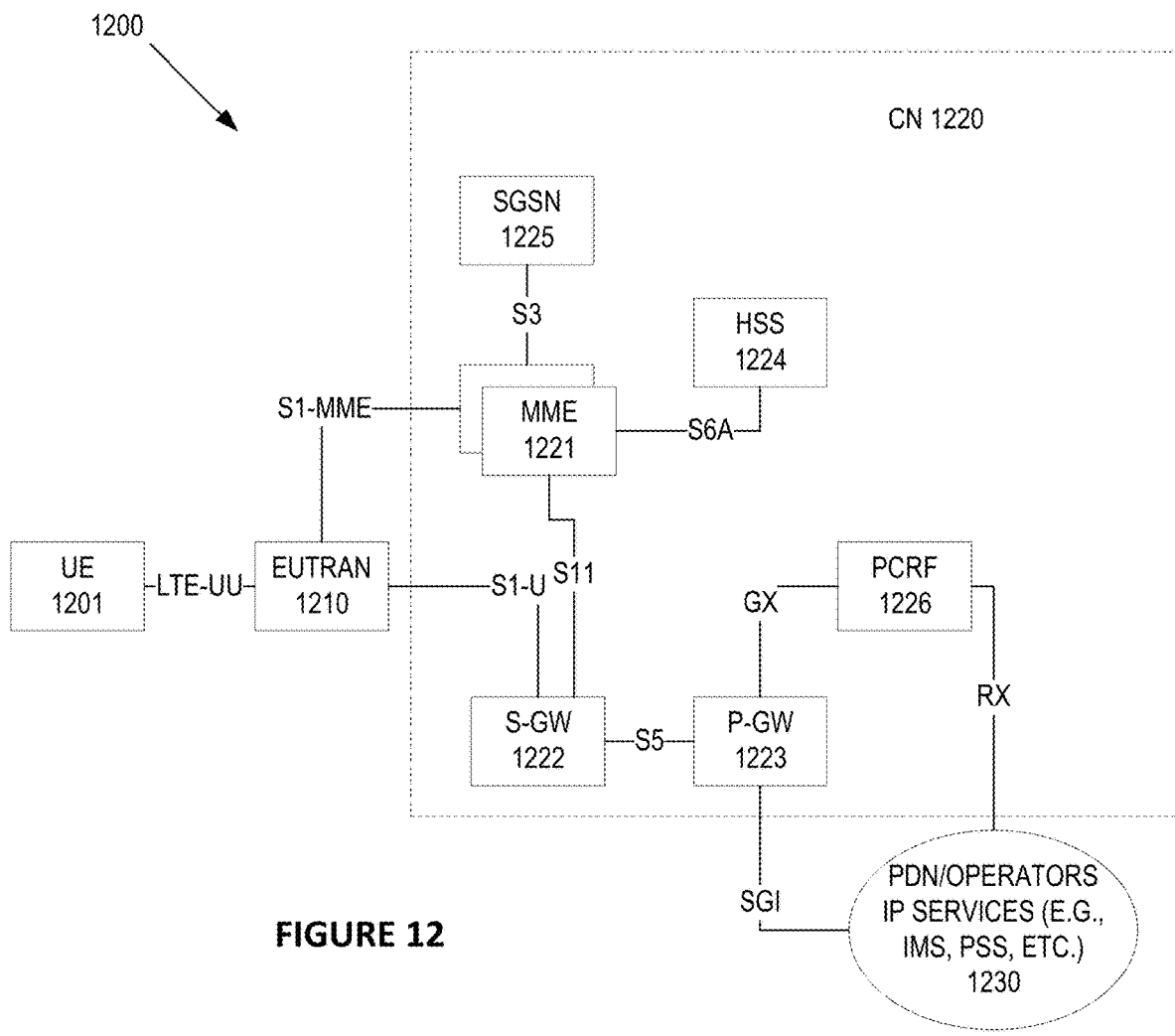
FIG. 12 illustrates an example architecture of a system including a first CN, in accordance with various embodiments

FIG. 12 illustrates an example architecture of a system 1200 including a first CN 1220, in accordance with various embodiments. In this example, system 1200 may implement the LTE standard wherein the CN 1220 is an EPC 1220 that corresponds with CN 1120 of FIG. 11. Additionally, the UE 1201 may be the same or similar as the UEs 1101 of FIG. 11, and the E-UTRAN 1210 may be a RAN that is the same or similar to the RAN 1110 of FIG. 11, and which may include RAN nodes 1111 discussed previously. The CN 1220 may comprise MMEs 1221, an S-GW 1222, a P-GW 1223, a HSS 1224, and a SGSN 1225.

The MMEs 1221 may be similar in function to the control plane of legacy SGSN, and may implement MM functions to keep track of the current location of a UE 1201. The MMEs 1221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 1201, provide user identity confidentiality, and/or perform other like services to users/subscribers. Each UE 1201 and the MME 1221 may include an MM or EMM sublayer, and an MM context may be established in the UE 1201 and the MME 1221 when an attach procedure is successfully completed. The MM context may be a data structure or database object that stores MM-related information of the UE 1201. The MMEs 1221 may be coupled with the HSS 1224 via an S6a reference point, coupled with the SGSN 1225 via an S3 reference point, and coupled with the S-GW 1222 via an S11 reference point.

The SGSN 1225 may be a node that serves the UE 1201 by tracking the location of an individual UE 1201 and performing security functions. In addition, the SGSN 1225 may perform Inter-EPC node signaling for mobility between 2G/3G and E-UTRAN 3GPP access networks; PDN and S-GW selection as specified by the MMEs 1221; handling of UE 1201 time zone functions as specified by the MMEs 1221; and MME selection for handovers to E-UTRAN 3GPP access network. The S3 reference point between the MMEs 1221 and the SGSN 1225 may enable user and bearer information exchange for inter-3GPP access network mobility in idle and/or active states.

The HSS 1224 may comprise a database for network users, including subscription-related information to support the network entities' handling of communication sessions. The EPC 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc. An S6a reference point between the HSS 1224 and the MMEs 1221 may enable transfer of subscription and authentication data for authenticating/authorizing user access to the EPC 1220 between HSS 1224 and the MMEs 1221.

The S-GW 1222 may terminate the S1 interface 1113 ("S1-U" in FIG. 12) toward the RAN 1210, and routes data packets between the RAN 1210 and the EPC 1220. In addition, the S-GW 1222 may be a local mobility anchor point for inter-RAN node handovers and also may provide an anchor for inter-3GPP mobility. Other responsibilities may include lawful intercept, charging, and some policy enforcement. The S11 reference point between the S-GW 1222 and the MMES 1221 may provide a control plane between the MMES 1221 and the S-GW 1222. The S-GW 1222 may be coupled with the P-GW 1223 via an S5 reference point.

The P-GW 1223 may terminate an SGi interface toward a PDN 1230. The P-GW 1223 may route data packets between the EPC 1220 and external networks such as a network including the application server 1130 (alternatively referred to as an "AF") via an IP interface 1125 (see e.g., FIG. 11). In embodiments, the P-GW 1223 may be communicatively coupled to an application server (application server 1130 of FIG. 11 or PDN 1230 in FIG. 12) via an IP communications interface 1125 (see, e.g., FIG. 11). The S5 reference point between the P-GW 1223 and the S-GW 1222 may provide user plane tunneling and tunnel management between the P-GW 1223 and the S-GW 1222. The S5 reference point may also be used for S-GW 1222 relocation due to UE 1201 mobility and if the S-GW 1222 needs to connect to a non-collocated P-GW 1223 for the required PDN connectivity. The P-GW 1223 may further include a node for policy enforcement and charging data collection (e.g., PCEF (not shown)). Additionally, the SGi reference point between the P-GW 1223 and the packet data network (PDN) 1230 may be an operator external public, a private PDN, or an intra operator packet data network, for example, for provision of IMS services. The P-GW 1223 may be coupled with a PCRF 1226 via a Gx reference point.

PCRF 1226 is the policy and charging control element of the EPC 1220. In a non-roaming scenario, there may be a single PCRF 1226 in the Home Public Land Mobile Network (HPLMN) associated with a UE 1201's Internet Protocol Connectivity Access Network (IP-CAN) session. In a roaming scenario with local breakout of traffic, there may be two PCRFs associated with a UE 1201's IP-CAN session, a Home PCRF (H-PCRF) within an HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate QoS and charging parameters. The PCRF 1226 may provision this rule into a PCEF (not shown) with the appropriate TFT and QCI, which commences the QoS and charging as specified by the application server 1230. The Gx reference point between the PCRF 1226 and the P-GW 1223 may allow for the transfer of QoS policy and charging rules from the PCRF 1226 to PCEF in the P-GW 1223. An Rx reference point may reside between the PDN 1230 (or "AF 1230") and the PCRF 1226.

Figure 13:
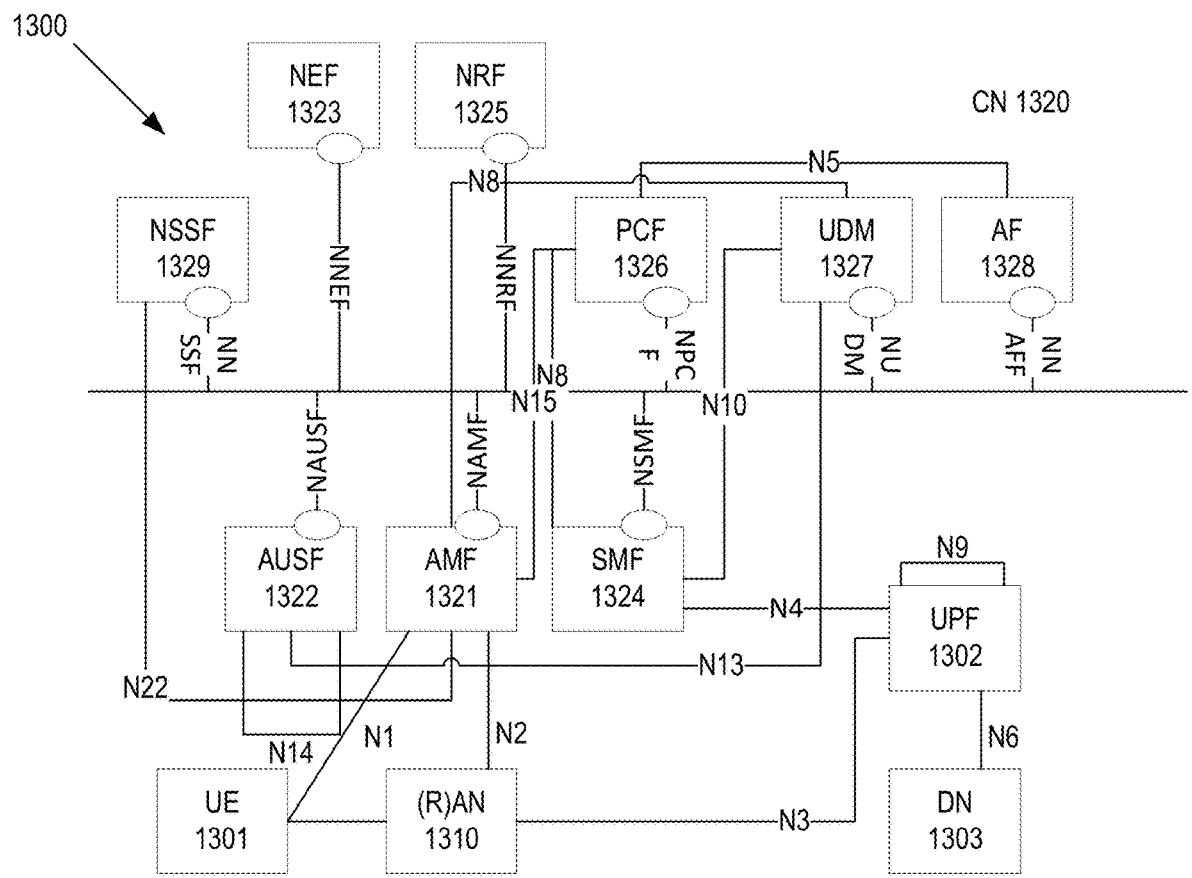
FIG. 13 illustrates an architecture of a system including a second CN in accordance with various embodiments.

FIG. 13 illustrates an architecture of a system 1300 including a second CN 130 in accordance with various embodiments. The system 1300 is shown to include a UE 1301, which may be the same or similar to the UEs 1101 and UE 13101 discussed previously; a (R)AN 1310, which may be the same or similar to the RAN 1110 and RAN 13110 discussed previously, and which may include RAN nodes 1111 discussed previously; and a DN 1303, which may be, for example, operator services, Internet access or 3rd party services; and a 5GC 130. The 5GC 130 may include an AUSF 132; an AMF 131; a SMF 134; a NEF 133; a PCF 136; a NRF 135; a UDM 137; an AF 138; a UPF 1302; and a NSSF 139.

The UPF 1302 may act as an anchor point for intra-RAT and inter-RAT mobility, an external PDU session point of interconnect to DN 1303, and a branching point to support multi-homed PDU session. The UPF 1302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 1302 may include an uplink classifier to support routing traffic flows to a data network. The DN 1303 may represent various network operator services, Internet access, or third party services. DN 1303 may include, or be similar to, application server 1130 discussed previously. The UPF 1302 may interact with the SMF 134 via an N4 reference point between the SMF 1324 and the UPF 1302.

The AUSF 1322 may store data for authentication of UE 1301 and handle authentication-related functionality. The AUSF 1322 may facilitate a common authentication framework for various access types. The AUSF 1322 may communicate with the AMF 1321 via an N12 reference point between the AMF 1321 and the AUSF 1322; and may communicate with the UDM 1327 via an N13 reference point between the UDM 1327 and the AUSF 1322. Additionally, the AUSF 1322 may exhibit an Nausf service-based interface.

The AMF 1321 may be responsible for registration management (e.g., for registering UE 1301, etc.), connection management, reachability management, mobility management, and lawful interception of AMF-related events, and access authentication and authorization. The AMF 1321 may be a termination point for the an N11 reference point between the AMF 1321 and the SMF 1324. The AMF 1321 may provide transport for SM messages between the UE 1301 and the SMF 1324, and act as a transparent proxy for routing SM messages. AMF 1321 may also provide transport for SMS messages between UE 1301 and an SMSF (not shown by FIG. 13). AMF 1321 may act as SEAF, which may include interaction with the AUSF 1322 and the UE 1301, receipt of an intermediate key that was established as a result of the UE 1301 authentication process. Where USIM based authentication is used, the AMF 1321 may retrieve the security material from the AUSF 1322. AMF 1321 may also include a SCM function, which receives a key from the SEA that it uses to derive access-network specific keys. Furthermore, AMF 1321 may be a termination point of a RAN CP interface, which may include or be an N2 reference point between the (R)AN 1310 and the AMF 1321; and the AMF 1321 may be a termination point of NAS (N1) signalling, and perform NAS ciphering and integrity protection.

AMF 1321 may also support NAS signalling with a UE 1301 over an N3 IWF interface. The N3IWF may be used to provide access to untrusted entities. N3IWF may be a termination point for the N2 interface between the (R)AN 1310 and the AMF 1321 for the control plane, and may be a termination point for the N3 reference point between the (R)AN 1310 and the UPF 1302 for the user plane. As such, the AMF 1321 may handle N2 signalling from the SMF 1324 and the AMF 1321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 1301 and AMF 1321 via an N1 reference point between the UE 1301 and the AMF 1321, and relay uplink and downlink user-plane packets between the UE 1301 and UPF 1302. The N3IWF also provides mechanisms for IPsec tunnel establishment with the UE 1301. The AMF 1321 may exhibit an Namf service-based interface, and may be a termination point for an N14 reference point between two AMFs 1321 and an N17 reference point between the AMF 1321 and a 5G-EIR (not shown by FIG. 13).

The UE 1301 may need to register with the AMF 1321 in order to receive network services. RM is used to register or deregister the UE 1301 with the network (e.g., AMF 1321), and establish a UE context in the network (e.g., AMF 1321). The UE 1301 may operate in an RM-REGISTERED state or an RM-DEREGISTERED state. In the RM DEREGISTERED state, the UE 1301 is not registered with the network, and the UE context in AMF 1321 holds no valid location or routing information for the UE 1301 so the UE 1301 is not reachable by the AMF 1321. In the RM REGISTERED state, the UE 1301 is registered with the network, and the UE context in AMF 1321 may hold a valid location or routing information for the UE 1301 so the UE 1301 is reachable by the AMF 1321. In the RM-REGISTERED state, the UE 1301 may perform mobility Registration Update procedures, perform periodic Registration Update procedures triggered by expiration of the periodic update timer (e.g., to notify the network that the UE 1301 is still active), and perform a Registration Update procedure to update UE capability information or to re-negotiate protocol parameters with the network, among others.

The AMF 1321 may store one or more RM contexts for the UE 1301, where each RM context is associated with a specific access to the network. The RM context may be a data structure, database object, etc. that indicates or stores, inter alia, a registration state per access type and the periodic update timer. The AMF 1321 may also store a 5GC MM context that may be the same or similar to the (E)MM context discussed previously. In various embodiments, the AMF 1321 may store a CE mode B Restriction parameter of the UE 1301 in an associated MM context or RM context. The AMF 1321 may also derive the value, when needed, from the UE's usage setting parameter already stored in the UE context (and/or MM/RM context).

CM may be used to establish and release a signaling connection between the UE 1301 and the AMF 1321 over the N1 interface. The signaling connection is used to enable NAS signaling exchange between the UE 1301 and the CN 1320, and comprises both the signaling connection between the UE and the AN (e.g., RRC connection or UE-N3IWF connection for non-3GPP access) and the N2 connection for the UE 1301 between the AN (e.g., RAN 1310) and the AMF 1321. The UE 1301 may operate in one of two CM states, CM-IDLE mode or CM-CONNECTED mode. When the UE 1301 is operating in the CM-IDLE state/mode, the UE 1301 may have no NAS signaling connection established with the AMF 1321 over the N1 interface, and there may be (R)AN 1310 signaling connection (e.g., N2 and/or N3 connections) for the UE 1301. When the UE 1301 is operating in the CM-CONNECTED state/mode, the UE 1301 may have an established NAS signaling connection with the AMF 1321 over the N1 interface, and there may be a (R)AN 1310 signaling connection (e.g., N2 and/or N3 connections) for the UE 1301. Establishment of an N2 connection between the (R)AN 1310 and the AMF 1321 may cause the UE 1301 to transition from CM-IDLE mode to CM-CONNECTED mode, and the UE 1301 may transition from the CM-CONNECTED mode to the CM-IDLE mode when N2 signaling between the (R)AN 1310 and the AMF 1321 is released.

The SMF 1324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 1301 and a data network (DN) 1303 identified by a Data Network Name (DNN). PDU sessions may be established upon UE 1301 request, modified upon UE 1301 and 5GC 1320 request, and released upon UE 1301 and 5GC 1320 request using NAS SM signaling exchanged over the N1 reference point between the UE 1301 and the SMF 1324. Upon request from an application server, the 5GC 1320 may trigger a specific application in the UE 1301. In response to receipt of the trigger message, the UE 1301 may pass the trigger message (or relevant parts/information of the trigger message) to one or more identified applications in the UE 1301. The identified application(s) in the UE 1301 may establish a PDU session to a specific DNN. The SMF 1324 may check whether the UE 1301 requests are compliant with user subscription information associated with the UE 1301. In this regard, the SMF 1324 may retrieve and/or request to receive update notifications on SMF 1324 level subscription data from the UDM 1327.

The SMF 1324 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 1324 may be included in the system 1300, which may be between another SMF 1324 in a visited network and the SMF 1324 in the home network in roaming scenarios. Additionally, the SMF 1324 may exhibit the Nsmf service-based interface.

The NEF 1323 may provide means for securely exposing the services and capabilities provided by 3GPP network functions for third party, internal exposure/re-exposure, Application Functions (e.g., AF 1328), edge computing or fog computing systems, etc. In such embodiments, the NEF 1323 may authenticate, authorize, and/or throttle the AFs. NEF 1323 may also translate information exchanged with the AF 1328 and information exchanged with internal network functions. For example, the NEF 1323 may translate between an AF-Service-Identifier and an internal 5GC information. NEF 1323 may also receive information from other network functions (NFs) based on exposed capabilities of other network functions. This information may be stored at the NEF 1323 as structured data, or at a data storage NF using standardized interfaces. The stored information can then be re-exposed by the NEF 1323 to other NFs and AFs, and/or used for other purposes such as analytics. Additionally, the NEF 1323 may exhibit an Nnef service-based interface.

The NRF 1325 may support service discovery functions, receive NF discovery requests from NF instances, and provide the information of the discovered NF instances to the NF instances. NRF 1325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1325 may exhibit the Nnrf service-based interface.

The PCF 1326 may provide policy rules to control plane function(s) to enforce them, and may also support unified policy framework to govern network behaviour. The PCF 1326 may also implement an FE to access subscription information relevant for policy decisions in a UDR of the UDM 1327. The PCF 1326 may communicate with the AMF 1321 via an N15 reference point between the PCF 1326 and the AMF 1321, which may include a PCF 1326 in a visited network and the AMF 1321 in case of roaming scenarios. The PCF 1326 may communicate with the AF 1328 via an N5 reference point between the PCF 1326 and the AF 1328; and with the SMF 1324 via an N7 reference point between the PCF 1326 and the SMF 1324. The system 1300 and/or CN 1320 may also include an N24 reference point between the PCF 1326 (in the home network) and a PCF 1326 in a visited network. Additionally, the PCF 1326 may exhibit an Npcf service-based interface.

The UDM 1327 may handle subscription-related information to support the network entities' handling of communication sessions, and may store subscription data of UE 1301. For example, subscription data may be communicated between the UDM 1327 and the AMF 1321 via an N8 reference point between the UDM 1327 and the AMF. The UDM 1327 may include two parts, an application FE and a UDR (the FE and UDR are not shown by FIG. 13). The UDR may store subscription data and policy data for the UDM 1327 and the PCF 1326, and/or structured data for exposure and application data (including PFDs for application detection, application request information for multiple UEs 1301) for the NEF 1323. The Nudr service-based interface may be exhibited by the UDR 221 to allow the UDM 1327, PCF 1326, and NEF 1323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 1324 via an N10 reference point between the UDM 1327 and the SMF 1324. UDM 1327 may also support SMS management, wherein an SMS-FE implements the similar application logic as discussed previously. Additionally, the UDM 1327 may exhibit the Nudm service-based interface.

The AF 1328 may provide application influence on traffic routing, provide access to the NCE, and interact with the policy framework for policy control. The NCE may be a mechanism that allows the 5GC 1320 and AF 1328 to provide information to each other via NEF 1323, which may be used for edge computing implementations. In such implementations, the network operator and third party services may be hosted close to the UE 1301 access point of attachment to achieve an efficient service delivery through the reduced end-to-end latency and load on the transport network. For edge computing implementations, the 5GC may select a UPF 1302 close to the UE 1301 and execute traffic steering from the UPF 1302 to DN 1303 via the N6 interface. This may be based on the UE subscription data, UE location, and information provided by the AF 1328. In this way, the AF 1328 may influence UPF (re)selection and traffic routing. Based on operator deployment, when AF 1328 is considered to be a trusted entity, the network operator may permit AF 1328 to interact directly with relevant NFs. Additionally, the AF 1328 may exhibit an Naf service-based interface.

The NSSF 1329 may select a set of network slice instances serving the UE 1301. The NSSF 1329 may also determine allowed NSSAI and the mapping to the subscribed S-NSSAIs, if needed. The NSSF 1329 may also determine the AMF set to be used to serve the UE 1301, or a list of candidate AMF(s) 1321 based on a suitable configuration and possibly by querying the NRF 1325. The selection of a set of network slice instances for the UE 1301 may be triggered by the AMF 1321 with which the UE 1301 is registered by interacting with the NSSF 1329, which may lead to a change of AMF 1321. The NSSF 1329 may interact with the AMF 1321 via an N22 reference point between AMF 1321 and NSSF 1329; and may communicate with another NSSF 1329 in a visited network via an N31 reference point (not shown by FIG. 13). Additionally, the NSSF 1329 may exhibit an Nnssf service-based interface.

As discussed previously, the CN 1320 may include an SMSF, which may be responsible for SMS subscription checking and verification, and relaying SM messages to/from the UE 1301 to/from other entities, such as an SMS-GMSC/IWMSC/SMS-router. The SMS may also interact with AMF 1321 and UDM 1327 for a notification procedure that the UE 1301 is available for SMS transfer (e.g., set a UE not reachable flag, and notifying UDM 1327 when UE 13201 is available for SMS).

The CN 1320 may also include other elements that are not shown by FIG. 13, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 13). Individual NFs may share a UDSF for storing their respective unstructured data or individual NFs may each have their own UDSF located at or near the individual NFs. Additionally, the UDSF may exhibit an Nudsf service-based interface (not shown by FIG. 13). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 13 for clarity. In one example, the CN 1320 may include an Nx interface, which is an inter-CN interface between the MME (e.g., MME 1221) and the AMF 1321 in order to enable interworking between CN 1320 and CN 1220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 14:
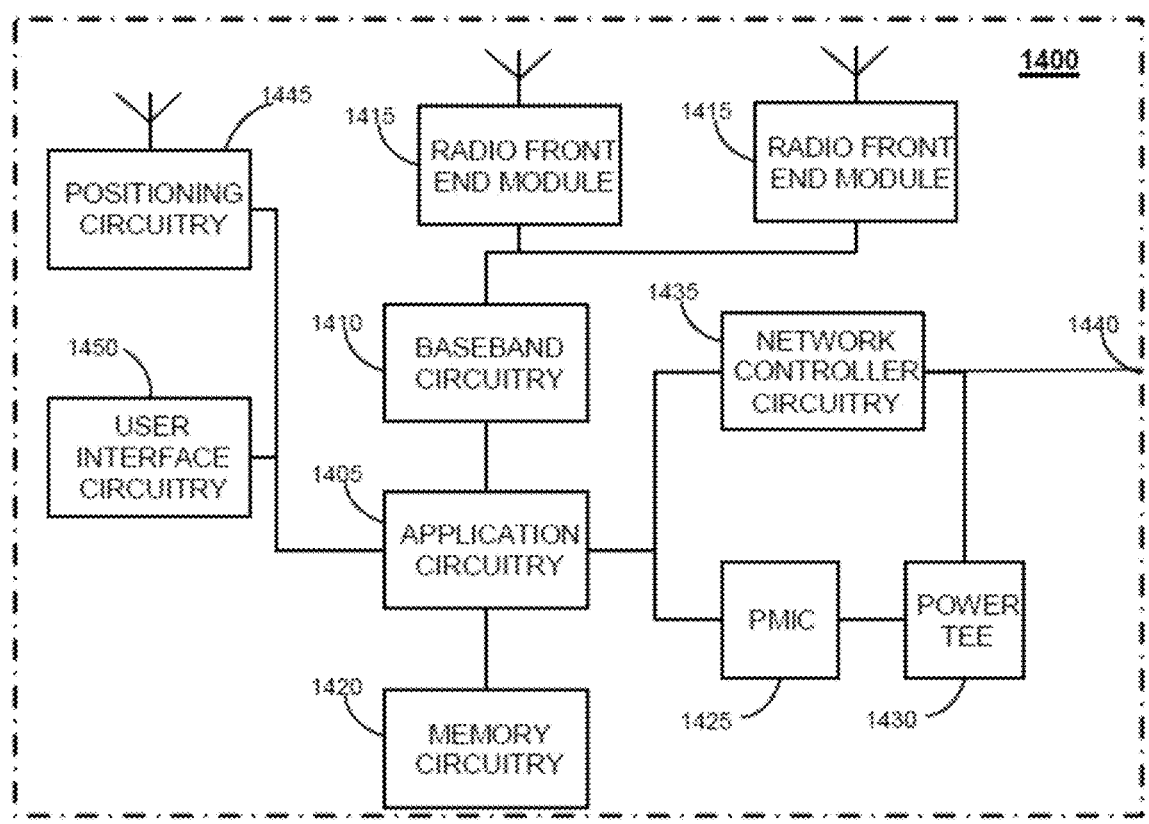
FIG. 14 illustrates an example of infrastructure equipment in accordance with various embodiments.

FIG. 14 illustrates an example of infrastructure equipment 1400 in accordance with various embodiments. The infrastructure equipment 1400 (or "system 1400") may be implemented as a base station, radio head, RAN node such as the RAN nodes 1111 and/or AP 1106 shown and described previously, application server(s) 1130, and/or any other element/device discussed herein. In other examples, the system 1400 could be implemented in or by a UE.

The system 1400 includes application circuitry 1405, baseband circuitry 1410, one or more radio front end modules (RFEMs) 1415, memory circuitry 1420, power management integrated circuitry (PMIC) 1425, power tee circuitry 1430, network controller circuitry 1435, network interface connector 1440, satellite positioning circuitry 1445, and user interface 1450. In some embodiments, the device 1400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (110 or 10), memory card controllers such as Secure Digital (SD), MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1405 may comprise, or may be, a special-purpose processor/controller to operate according to the various embodiments herein. As examples, the processor(s) of application circuitry 1405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1400 may not utilize application circuitry 1405, and instead may include a special-purpose processor/controller to process IP data received from an EPC or 5GC, for example.

In some implementations, the application circuitry 1405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1405 may comprise logic blocks or logic fabric, and other interconnected resources that may be programmed to perform various functions, such as the procedures, methods, functions, etc. of the various embodiments discussed herein. In such embodiments, the circuitry of application circuitry 1405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1410 are discussed infra with regard to FIG. 16.

User interface circuitry 1450 may include one or more user interfaces designed to enable user interaction with the system 1400 or peripheral component interfaces designed to enable peripheral component interaction with the system 1400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1415, which incorporates both mmWave antennas and sub-mmWave.

The memory circuitry 1420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1420 may be implemented as one or more of solder down packaged integrated circuits, socketed memory modules and plug-in memory cards.

The PMIC 1425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1430 may provide for electrical power drawn from a network cable to provide both power supply and data connectivity to the infrastructure equipment 1400 using a single cable.

The network controller circuitry 1435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1400 via network interface connector 1440 using a physical connection, which may be electrical (commonly referred to as a "copper interconnect"), optical, or wireless. The network controller circuitry 1435 may include one or more dedicated processors and/or FPGAs to communicate using one or more of the aforementioned protocols. In some implementations, the network controller circuitry 1435 may include multiple controllers to provide connectivity to other networks using the same or different protocols.

The positioning circuitry 1445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1445 may include a Micro-Technology for Positioning, Navigation, and Timing (Micro-PNT) IC that uses a master timing clock to perform position tracking/estimation without GNSS assistance. The positioning circuitry 1445 may also be part of, or interact with, the baseband circuitry 1410 and/or RFEMs 1415 to communicate with the nodes and components of the positioning network. The positioning circuitry 1445 may also provide position data and/or time data to the application circuitry 1405, which may use the data to synchronize operations with various infrastructure (e.g., RAN nodes 1111, etc.), or the like.

The components shown by FIG. 14 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 15:
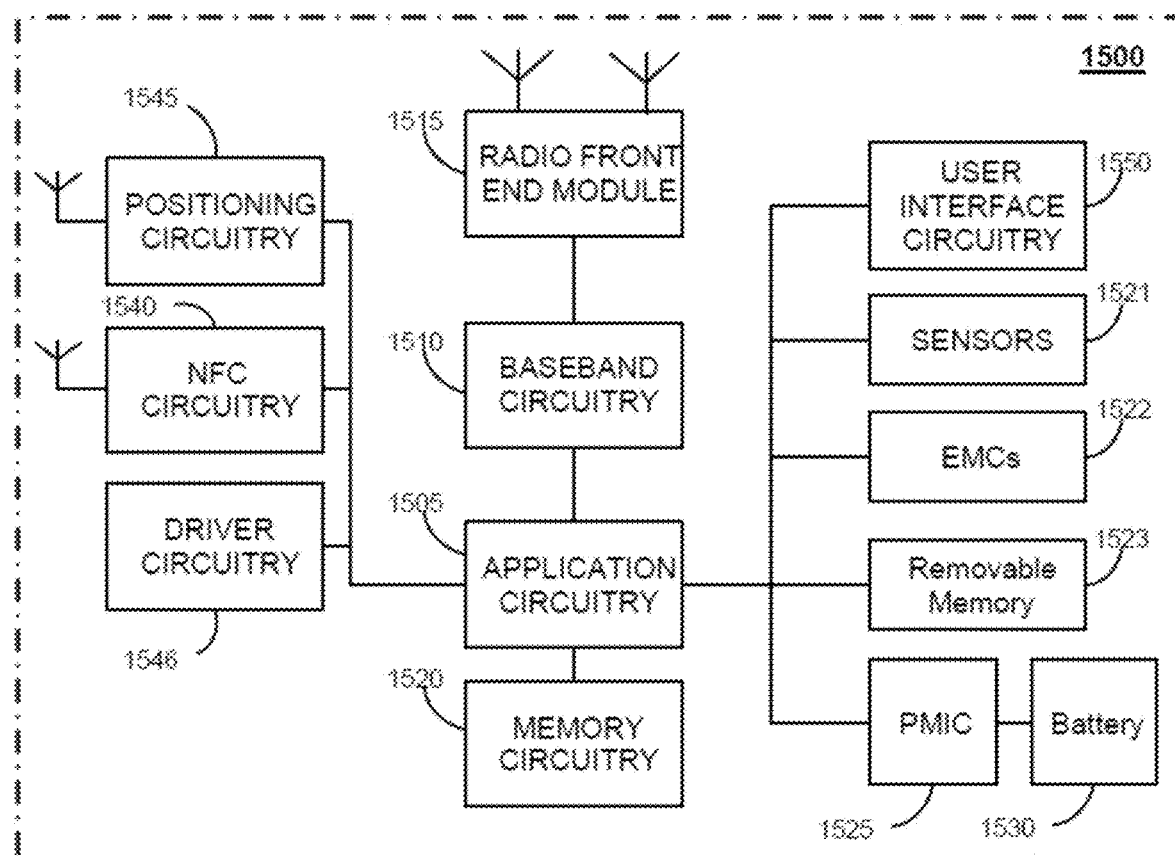
FIG. 15 illustrates an example of a platform in accordance with various embodiments.

FIG. 15 illustrates an example of a platform 1500 (or "device 1500") in accordance with various embodiments. In embodiments, the computer platform 1500 may be suitable for use as UEs 1101, 1201, 1301, application servers 1130, and/or any other element/device discussed herein. The platform 1500 may include any combinations of the components shown in the example. The components of platform 1500 may be implemented as integrated circuits (ICs), portions thereof, discrete electronic devices, or other modules, logic, hardware, software, firmware, or a combination thereof adapted in the computer platform 1500, or as components otherwise incorporated within a chassis of a larger system. The block diagram of FIG. 15 is intended to show a high level view of components of the computer platform 1500. However, some of the components shown may be omitted, additional components may be present, and different arrangement of the components shown may occur in other implementations.

Application circuitry 1505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 15105 may comprise, or may be, a special-purpose processor/controller to operate according to the various embodiments herein.

As examples, the processor(s) of application circuitry 1505 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 1505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1505 may be a part of a system on a chip (SoC) in which the application circuitry 1505 and other components are formed into a single integrated circuit, or a single package, such as the Edison™ or Galileo™ SoC boards from Intel® Corporation.

Additionally or alternatively, application circuitry 1505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1510 are discussed infra with regard to FIG. 16.

The RFEMs 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 1611 of FIG. 16 infra), and the RFEM may be connected to multiple antennas. In alternative implementations, both mmWave and sub-mmWave radio functions may be implemented in the same physical RFEM 1515, which incorporates both mmWave antennas and sub-mmWave.

The memory circuitry 1520 may include any number and type of memory devices used to provide for a given amount of system memory. As examples, the memory circuitry 1520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1520 may be developed in accordance with a Joint Electron Devices Engineering Council (JEDEC) low power double data rate (LPDDR)-based design, such as LPDDR2, LPDDR3, LPDDR4, or the like. Memory circuitry 1520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1520 may be on-die memory or registers associated with the application circuitry 1505. To provide for persistent storage of information such as data, applications, operating systems and so forth, memory circuitry 1520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1500 may incorporate the three-dimensional (3D) cross-point (XPOINT) memories from Intel® and Micron®.

Removable memory circuitry 1523 may include devices, circuitry, enclosures/housings, ports or receptacles, etc. used to couple portable data storage devices with the platform 1500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1500 may also include interface circuitry (not shown) that is used to connect external devices with the platform 1500. The external devices connected to the platform 1500 via the interface circuitry include sensor circuitry 1521 and electro-mechanical components (EMCs) 1522, as well as removable memory devices coupled to removable memory circuitry 1523.

The sensor circuitry 1521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1522 include devices, modules, or subsystems whose purpose is to enable platform 1500 to change its state, position, and/or orientation, or move or control a mechanism or (sub)system. Additionally, EMCs 1522 may be configured to generate and send messages/signalling to other components of the platform 1500 to indicate a current state of the EMCs 1522. Examples of the EMCs 1522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1500 is configured to operate one or more EMCs 1522 based on one or more captured events and/or instructions or control signals received from a service provider and/or various clients.

In some implementations, the interface circuitry may connect the platform 1500 with positioning circuitry 1545. The positioning circuitry 1545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-PNT IC that uses a master timing clock to perform position tracking/estimation without GNSS assistance. The positioning circuitry 1545 may also be part of, or interact with, the baseband circuitry 15110 and/or RFEMs 1515 to communicate with the nodes and components of the positioning network. The positioning circuitry 1545 may also provide position data and/or time data to the application circuitry 1505, which may use the data to synchronize operations with various infrastructure (e.g., radio base stations), for turn-by-turn navigation applications, or the like In some implementations, the interface circuitry may connect the platform 1500 with Near-Field Communication (NFC) circuitry 1540. NFC circuitry 1540 is configured to provide contactless, short-range communications based on radio frequency identification (RFID) standards, wherein magnetic field induction is used to enable communication between NFC circuitry 1540 and NFC-enabled devices external to the platform 1500 (e.g., an "NFC touchpoint"). NFC circuitry 1540 comprises an NFC controller coupled with an antenna element and a processor coupled with the NFC controller. The NFC controller may be a chip/IC providing NFC functionalities to the NFC circuitry 1540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1540, or initiate data transfer between the NFC circuitry 1540 and another active NFC device (e.g., a smartphone or an NFC-enabled POS terminal) that is proximate to the platform 1500.

The driver circuitry 1546 may include software and hardware elements that operate to control particular devices that are embedded in the platform 1500, attached to the platform 1500, or otherwise communicatively coupled with the platform 1500. The driver circuitry 1546 may include individual drivers allowing other components of the platform 1500 to interact with or control various input/output (I/O) devices that may be present within, or connected to, the platform 1500. For example, driver circuitry 1546 may include a display driver to control and allow access to a display device, a touchscreen driver to control and allow access to a touchscreen interface of the platform 1500, sensor drivers to obtain sensor readings of sensor circuitry 1521 and control and allow access to sensor circuitry 1521, EMC drivers to obtain actuator positions of the EMCs 1522 and/or control and allow access to the EMCs 1522, a camera driver to control and allow access to an embedded image capture device, audio drivers to control and allow access to one or more audio devices.

The power management integrated circuitry (PMIC) 1525 (also referred to as "power management circuitry 1525") may manage power provided to various components of the platform 1500. In particular, with respect to the baseband circuitry 1510, the PMIC 1525 may control power-source selection, voltage scaling, battery charging, or DC-to-DC conversion. The PMIC 1525 may often be included when the platform 1500 is capable of being powered by a battery 1530, for example, when the device is included in a UE 1101, 1201, 1301.

In some embodiments, the PMIC 1525 may control, or otherwise be part of, various power saving mechanisms of the platform 1500. For example, if the platform 1500 is in an RRC_Connected state, where it is still connected to the RAN node as it expects to receive traffic shortly, then it may enter a state known as Discontinuous Reception Mode (DRX) after a period of inactivity. During this state, the platform 1500 may power down for brief intervals of time and thus save power. If there is no data traffic activity for an extended period of time, then the platform 1500 may transition off to an RRC Idle state, where it disconnects from the network and does not perform operations such as channel quality feedback, handover, etc. The platform 1500 goes into a very low power state and it performs paging where again it periodically wakes up to listen to the network and then powers down again. The platform 1500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1530 may power the platform 1500, although in some examples the platform 1500 may be mounted deployed in a fixed location, and may have a power supply coupled to an electrical grid. The battery 1530 may be a lithium ion battery, a metal-air battery, such as a zinc-air battery, an aluminum-air battery, a lithium-air battery, and the like. In some implementations, such as in V2X applications, the battery 1530 may be a typical lead-acid automotive battery.

In some implementations, the battery 1530 may be a "smart battery," which includes or is coupled with a Battery Management System (BMS) or battery monitoring integrated circuitry. The BMS may be included in the platform 1500 to track the state of charge (SoCh) of the battery 1530. The BMS may be used to monitor other parameters of the battery 1530 to provide failure predictions, such as the state of health (SoH) and the state of function (SoF) of the battery 1530. The BMS may communicate the information of the battery 1530 to the application circuitry 1505 or other components of the platform 1500. The BMS may also include an analog-to-digital (ADC) convertor that allows the application circuitry 1505 to directly monitor the voltage of the battery 1530 or the current flow from the battery 1530. The battery parameters may be used to determine actions that the platform 1500 may perform, such as transmission frequency, network operation, sensing frequency, and the like.

A power block, or other power supply coupled to an electrical grid may be coupled with the BMS to charge the battery 1530. In some examples, the power block 1530 may be replaced with a wireless power receiver to obtain the power wirelessly, for example, through a loop antenna in the computer platform 1500. In these examples, a wireless battery charging circuit may be included in the BMS. The specific charging circuits chosen may depend on the size of the battery 1530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1550 includes various input/output (I/O) devices present within, or connected to, the platform 1500, and includes one or more user interfaces designed to enable user interaction with the platform 1500 and/or peripheral component interfaces designed to enable peripheral component interaction with the platform 1500. The user interface circuitry 1550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1500. The output device circuitry may also include speakers or other audio emitting devices, printer(s), and/or the like. In some embodiments, the sensor circuitry 1521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 16:
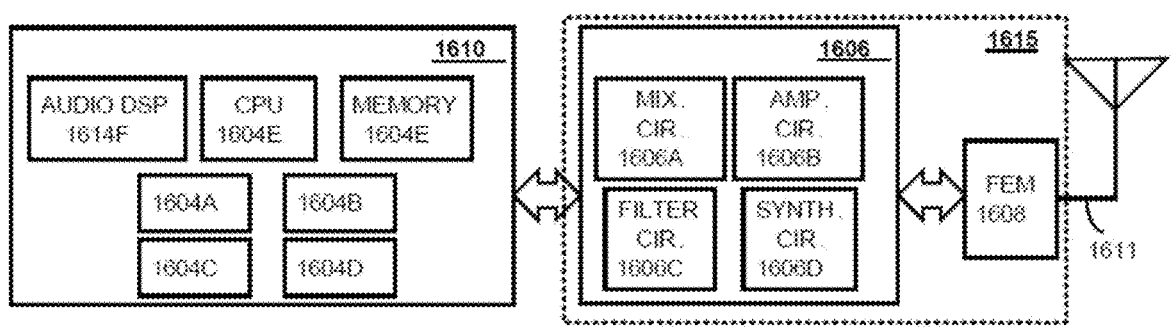
FIG. 16 illustrates example components of baseband circuitry and radio front end modules (RFEM) in accordance with various embodiments.

FIG. 16 illustrates example components of baseband circuitry 1610 and radio front end modules (RFEM) 1615 in accordance with various embodiments. The baseband circuitry 1610 corresponds to the baseband circuitry 140 and 1510 of FIGS. 14 and 15, respectively. The RFEM 1615 corresponds to the RFEM 145 and 1515 of FIGS. 14 and 15, respectively. As shown, the RFEMs 1615 may include Radio Frequency (RF) circuitry 1606, front-end module (FEM) circuitry 1608, antenna array 1611 coupled together at least as shown.

The baseband circuitry 1610 includes circuitry and/or control logic configured to carry out various radio/network protocol and radio control functions that enable communication with one or more radio networks via the RF circuitry

1606. The radio control functions may include, but are not limited to, signal modulation/demodulation, encoding/decoding, radio frequency shifting, etc. In some embodiments, modulation/demodulation circuitry of the baseband circuitry 1610 may include Fast-Fourier Transform (FFT), precoding, or constellation mapping/demapping functionality. In some embodiments, encoding/decoding circuitry of the baseband circuitry 1610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 1610 is configured to process baseband signals received from a receive signal path of the RF circuitry 1606 and to generate baseband signals for a transmit signal path of the RF circuitry 1606. The baseband circuitry 1610 is configured to interface with application circuitry 1405/1505 (see FIGS. 14 and 15) for generation and processing of the baseband signals and for controlling operations of the RF circuitry 1606. The baseband circuitry 1610 may handle various radio control functions.

The aforementioned circuitry and/or control logic of the baseband circuitry 1610 may include one or more single or multi-core processors. For example, the one or more processors may include a 3G baseband processor 1604A, a 4G/LTE baseband processor 1604B, a 5G/NR baseband processor 1604C, or some other baseband processor(s) 1604D for other existing generations, generations in development or to be developed in the future (e.g., si16h generation (6G), etc.). In other embodiments, some or all of the functionality of baseband processors 1604A-D may be included in modules stored in the memory 1604G and executed via a Central Processing Unit (CPU) 1604E. In other embodiments, some or all of the functionality of baseband processors 1604A-D may be provided as hardware accelerators (e.g., FPGAs, ASICs, etc.) loaded with the appropriate bit streams or logic blocks stored in respective memory cells. In various embodiments, the memory 1604G may store program code of a real-time OS (RTOS), which when executed by the CPU 1604E (or other baseband processor), is to cause the CPU 1604E (or other baseband processor) to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 1610 includes one or more audio digital signal processor(s) (DSP) 1604F. The audio DSP(s) 1604F include elements for compression/decompression and echo cancellation and may include other suitable processing elements in other embodiments.

In some embodiments, each of the processors 1604A-1604E include respective memory interfaces to send/receive data to/from the memory 1604G. The baseband circuitry 1610 may further include one or more interfaces to communicatively couple to other circuitries/devices, such as an interface to send/receive data to/from memory e16ernal to the baseband circuitry 1610; an application circuitry interface to send/receive data to/from the application circuitry 1405/1505 of FIGS. 14-16); an RF circuitry interface to send/receive data to/from RF circuitry 1606 of FIG. 16; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 155.

In alternate embodiments (which may be combined with the above described embodiments), baseband circuitry 1610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1610 may include protocol processing circuitry with one or more instances of control circuitry (not shown) to provide control functions for the digital baseband circuitry and/or radio frequency circuitry (e.g., the radio front end modules 1615).

Although not shown by FIG. 16, in some embodiments, the baseband circuitry 1610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 1610 and/or RF circuitry 1606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 1610 and/or RF circuitry 1606 are part of a Wi-Fi communication system. In the second example, the protocol processing circuitry would operate Wi-Fi MAC and logical link control (LLC) functions. The protocol processing circuitry may include one or more memory structures (e.g., 1604G) to store program code and data for operating the protocol functions, as well as one or more processing cores to execute the program code and perform various operations using the data. The baseband circuitry 1610 may also support radio communications for more than one wireless protocol.

The various hardware elements of the baseband circuitry 1610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 1610 may be suitably combined in a single chip or chipset, or disposed on a same circuit board. In another example, some or all of the constituent components of the baseband circuitry 1610 and RF circuitry 1606 may be implemented together such as, for example, a system on a chip (SoC) or System-in-Package (SiP). In another example, some or all of the constituent components of the baseband circuitry 1610 may be implemented as a separate SoC that is communicatively coupled with and RF circuitry 1606 (or multiple instances of RF circuitry 1606). In yet another example, some or all of the constituent components of the baseband circuitry 1610 and the application circuitry 1405/1505 may be implemented together as individual SoCs mounted to a same circuit board (e.g., a "multi-chip package").

In some embodiments, the baseband circuitry 1610 may provide for communication compatible with one or more radio technologies. For example, in some embodiments, the baseband circuitry 1610 may support communication with an E-UTRAN or other WMAN, a WLAN, a WPAN. Embodiments in which the baseband circuitry 1610 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path, which may include circuitry to down-convert RF signals received from the FEM circuitry 1608 and provide baseband signals to the baseband circuitry 1610. RF circuitry 1606 may also include a transmit signal path, which may include circuitry to up-convert baseband signals provided by the baseband circuitry 1610 and provide RF output signals to the FEM circuitry 1608 for transmission.

In some embodiments, the receive signal path of the RF circuitry 1606 may include mixer circuitry 1606a, amplifier circuitry 1606b and filter circuitry 1606c. In some embodiments, the transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1610 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1610 and may be filtered by filter circuitry 1606c.

In some embodiments, the mixer circuitry 1606a of the receive signal path and the mixer circuitry 1606a of the transmit signal path may include two or more mixers and may be arranged for quadrature downconversion and upconversion, respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a of the transmit signal path may be arranged for direct downconversion and direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1610 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1610 or the application circuitry 1405/1505 depending on the desired output frequency. In some embodiments, a divider control input (e.g., N) may be determined from a look-up table based on a channel indicated by the application circuitry 1405/1505.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path, which may include circuitry configured to operate on RF signals received from antenna array 1611, amplify the received signals and provide the amplified versions of the received signals to the RF circuitry 1606 for further processing. FEM circuitry 1608 may also include a transmit signal path, which may include circuitry configured to amplify signals for transmission provided by the RF circuitry 1606 for transmission by one or more of antenna elements of antenna array 1611. In various embodiments, the amplification through the transmit or receive signal paths may be done solely in the RF circuitry 1606, solely in the FEM circuitry 1608, or in both the RF circuitry 1606 and the FEM circuitry 1608.

In some embodiments, the FEM circuitry 1608 may include a TX/RX switch to switch between transmit mode and receive mode operation. The FEM circuitry 1608 may include a receive signal path and a transmit signal path. The receive signal path of the FEM circuitry 1608 may include an LNA to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission by one or more antenna elements of the antenna array 1611.

The antenna array 1611 comprises one or more antenna elements, each of which is configured convert electrical signals into radio waves to travel through the air and to convert received radio waves into electrical signals. For example, digital baseband signals provided by the baseband circuitry 1610 is converted into analog RF signals (e.g., modulated waveform) that will be amplified and transmitted via the antenna elements of the antenna array 1611 including one or more antenna elements (not shown). The antenna elements may be omnidirectional, direction, or a combination thereof. The antenna elements may be formed in a multitude of arranges as are known and/or discussed herein. The antenna array 1611 may comprise microstrip antennas or printed antennas that are fabricated on the surface of one or more printed circuit boards. The antenna array 1611 may be formed in as a patch of metal foil (e.g., a patch antenna) in a variety of shapes, and may be coupled with the RF circuitry 1606 and/or FEM circuitry 1608 using metal transmission lines or the like.

Processors of the application circuitry 1405/1505 and processors of the baseband circuitry 1610 may be used to execute elements of one or more instances of a protocol stack. For example, processors of the baseband circuitry 1610, alone or in combination, may be used execute Layer 3, Layer 2, or Layer 1 functionality, while processors of the application circuitry 1405/1505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 17:
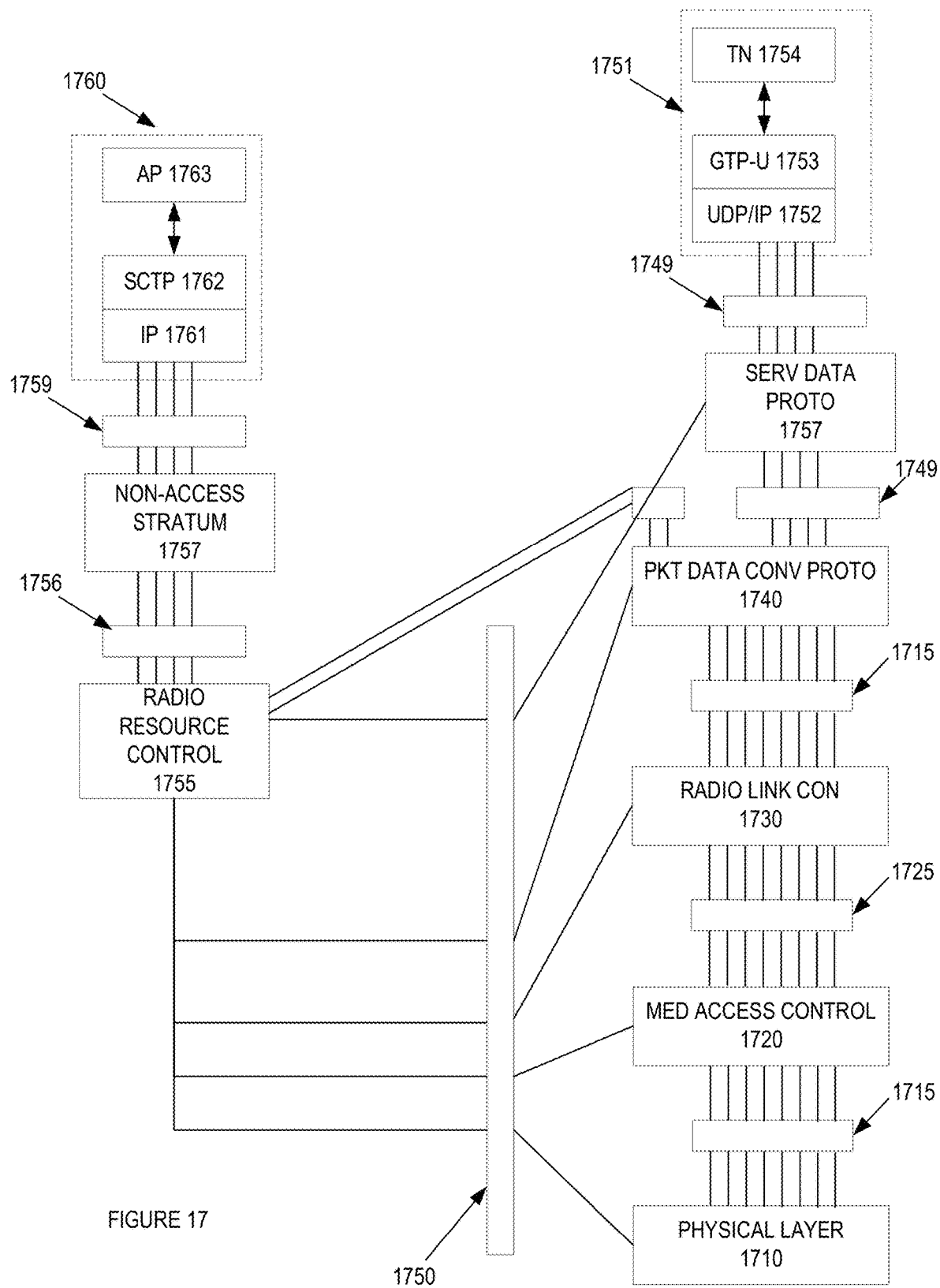
FIG. 17 illustrates various protocol functions that may be implemented in a wireless communication device according to various embodiments.

FIG. 17 illustrates various protocol functions that may be implemented in a wireless communication device according to various embodiments. In particular, FIG. 17 includes an arrangement 1700 showing interconnections between various protocol layers/entities. The following description of FIG. 17 is provided for various protocol layers/entities that operate in conjunction with the 5G/NR system standards and LTE system standards, but some or all of the aspects of FIG. 17 may be applicable to other wireless communication network systems as well.

The protocol layers of arrangement 1700 may include one or more of PHY 1710, MAC 1720, RLC 1730, PDCP 1740, SDAP 1747, RRC 1755, and NAS layer 1757, in addition to other higher layer functions not illustrated. The protocol layers may include one or more service access points (e.g., items 1759, 1756, 1750, 1749, 1745, 1735, 1725, and 1715 in FIG. 17) that may provide communication between two or more protocol layers.

The PHY 1710 may transmit and receive physical layer signals 1705 that may be received from or transmitted to one or more other communication devices. The physical layer signals 1705 may comprise one or more physical channels, such as those discussed herein. The PHY 1710 may further perform link adaptation or adaptive modulation and coding (AMC), power control, cell search (e.g., for initial synchronization and handover purposes), and other measurements used by higher layers, such as the RRC 1755. The PHY 1710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1710 may process requests from and provide indications to an instance of MAC 1720 via one or more PHY-SAP 1715. According to some embodiments, requests and indications communicated via PHY-SAP 1715 may comprise one or more transport channels.

Instance(s) of MAC 1720 may process requests from, and provide indications to, an instance of RLC 1730 via one or more MAC-SAPs 1725. These requests and indications communicated via the MAC-SAP 1725 may comprise one or more logical channels. The MAC 1720 may perform mapping between the logical channels and transport channels, multiplexing of MAC SDUs from one or more logical channels onto TBs to be delivered to PHY 1710 via the transport channels, de-multiplexing MAC SDUs to one or more logical channels from TBs delivered from the PHY 1710 via transport channels, multiplexing MAC SDUs onto TBs, scheduling information reporting, error correction through HARQ, and logical channel prioritization.

Instance(s) of RLC 1730 may process requests from and provide indications to an instance of PDCP 1740 via one or more radio link control service access points (RLC-SAP) 1735. These requests and indications communicated via RLC-SAP 1735 may comprise one or more RLC channels. The RLC 1730 may operate in a plurality of modes of operation, including: Transparent Mode™, Unacknowledged Mode (UM), and Acknowledged Mode (AM). The RLC 1730 may execute transfer of upper layer protocol data units (PDUs), error correction through automatic repeat request (ARQ) for AM data transfers, and concatenation, segmentation and reassembly of RLC SDUs for UM and AM data transfers. The RLC 1730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1740 may process requests from and provide indications to instance(s) of RRC 1755 and/or instance(s) of SDAP 1747 via one or more packet data convergence protocol service access points (PDCP-SAP) 1745. These requests and indications communicated via PDCP-SAP 1745 may comprise one or more radio bearers. The PDCP 1740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1747 may process requests from and provide indications to one or more higher layer protocol entities via one or more SDAP-SAP 1749. These requests and indications communicated via SDAP-SAP 1749 may comprise one or more QoS flows. The SDAP 1747 may map QoS flows to DRBs, and vice versa, and may also mark QFIs in DL and UL packets. A single SDAP entity 1747 may be configured for an individual PDU session. In the UL direction, the NG-RAN 1110 may control the mapping of QoS Flows to DRB(s) in two different ways, reflective mapping or explicit mapping. For reflective mapping, the SDAP 1747 of a UE 1101 may monitor the QFIs of the DL packets for each DRB, and may apply the same mapping for packets flowing in the UL direction. For a DRB, the SDAP 1747 of the UE 1101 may map the UL packets belonging to the QoS flows(s) corresponding to the QoS flow ID(s) and PDU session observed in the DL packets for that DRB. To enable reflective mapping, the NG-RAN 1310 may mark DL packets over the Uu interface with a QoS flow ID. The explicit mapping may involve the RRC 1755 configuring the SDAP 1747 with an explicit QoS flow to DRB mapping rule, which may be stored and followed by the SDAP 1747. In embodiments, the SDAP 1747 may only be used in NR implementations and may not be used in LTE implementations.

The RRC 1755 may configure, via one or more management service access points (M-SAP), aspects of one or more protocol layers, which may include one or more instances of PHY 1710, MAC 1720, RLC 1730, PDCP 1740 and SDAP 1747. In embodiments, an instance of RRC 1755 may process requests from and provide indications to one or more NAS entities 1757 via one or more RRC-SAPs 1756. The main services and functions of the RRC 1755 may include broadcast of system information (e.g., included in MIBs or SIBs related to the NAS), broadcast of system information related to the access stratum (AS), paging, establishment, maintenance and release of an RRC connection between the UE 1101 and RAN 1110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1757 may form the highest stratum of the control plane between the UE 1101 and the AMF 131. The NAS 1757 may support the mobility of the UEs 1101 and the session management procedures to establish and maintain IP connectivity between the UE 1101 and a P-GW in LTE systems.

According to various embodiments, one or more protocol entities of arrangement 1700 may be implemented in UEs 1101, RAN nodes 1111, AMF 131 in NR implementations or MME 1221 in LTE implementations, UPF 1302 in NR implementations or S-GW 1222 and P-GW 1223 in LTE implementations, or the like to be used for control plane or user plane communications protocol stack between the aforementioned devices. In such embodiments, one or more protocol entities that may be implemented in one or more of UE 1101, gNB 1111, AMF 131, etc. may communicate with a respective peer protocol entity that may be implemented in or on another device using the services of respective lower layer protocol entities to perform such communication. In some embodiments, a gNB-CU of the gNB 1111 may host the RRC 1755, SDAP 1747, and PDCP 1740 of the gNB that controls the operation of one or more gNB-DUs, and the gNB-DUs of the gNB 1111 may each host the RLC 1730, MAC 1720, and PHY 1710 of the gNB 1111.

In a first example, a control plane protocol stack may comprise, in order from highest layer to lowest layer, NAS 1757, RRC 1755, PDCP 1740, RLC 1730, MAC 1720, and PHY 1710. In this example, upper layers 1760 may be built on top of the NAS 1757, which includes an IP layer 1761, an SCTP 1762, and an application layer signaling protocol (AP) 1763.

In NR implementations, the AP 1763 may be an NG application protocol layer (NGAP or NG-AP) 1763 for the NG interface 1113 defined between the NG-RAN node 1111 and the AMF 131, or the AP 1763 may be an Xn application protocol layer (XnAP or Xn-AP) 1763 for the Xn interface 1112 that is defined between two or more RAN nodes 1111.

The NG-AP 1763 may support the functions of the NG interface 1113 and may comprise Elementary Procedures (EPs). An NG-AP EP may be a unit of interaction between the NG-RAN node 1111 and the AMF 131. The NG-AP 1763 services may comprise two groups: UE-associated services (e.g., services related to a UE 1101) and non-UE-associated services (e.g., services related to the whole NG interface instance between the NG-RAN node 1111 and AMF 131). These services may include functions including, but not limited to: a paging function for the sending of paging requests to NG-RAN nodes 1111 involved in a particular paging area; a UE context management function for allowing the AMF 131 to establish, modify, and/or release a UE context in the AMF 131 and the NG-RAN node 1111; a mobility function for UEs 1101 in ECM-CONNECTED mode for intra-system HOs to support mobility within NG-RAN and inter-system HOs to support mobility from/to EPS systems; a NAS Signaling Transport function for transporting or rerouting NAS messages between UE 1101 and AMF 131; a NAS node selection function for determining an association between the AMF 131 and the UE 1101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 1111 via CN 1120; and/or other like functions.

The XnAP 1763 may support the functions of the Xn interface 1112 and may comprise XnAP basic mobility procedures and XnAP global procedures. The XnAP basic mobility procedures may comprise procedures used to handle UE mobility within the NG RAN 1111 (or E-UTRAN 1210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 1101, such as Xn interface setup and reset procedures, NG-RAN update procedures, cell activation procedures, and the like.

In LTE implementations, the AP 1763 may be an S1 Application Protocol layer (S1-AP) 1763 for the S1 interface 1113 defined between an E-UTRAN node 1111 and an MME, or the AP 1763 may be an X2 application protocol layer (X2AP or X2-AP) 1763 for the X2 interface 1112 that is defined between two or more E-UTRAN nodes 1111.

The S1 Application Protocol layer (S1-AP) 1763 may support the functions of the S1 interface, and similar to the NG-AP discussed previously, the S1-AP may comprise S1-AP EPs. An S1-AP EP may be a unit of interaction between the E-UTRAN node 1111 and an MME 1221 within an LTE CN 1120. The S1-AP 1763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1763 may support the functions of the X2 interface 1112 and may comprise X2AP basic mobility procedures and X2AP global procedures. The X2AP basic mobility procedures may comprise procedures used to handle UE mobility within the E-UTRAN 1120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 1101, such as X2 interface setup and reset procedures, load indication procedures, error indication procedures, cell activation procedures, and the like.

The SCTP layer (alternatively referred to as the SCTP/IP layer) 1762 may provide guaranteed delivery of application layer messages (e.g., NGAP or XnAP messages in NR implementations, or S1-AP or X2AP messages in LTE implementations). The SCTP 1762 may ensure reliable delivery of signaling messages between the RAN node 1111 and the AMF 131/MME 1221 based, in part, on the IP protocol, supported by the IP 1761. The Internet Protocol layer (IP) 1761 may be used to perform packet addressing and routing functionality. In some implementations the IP layer 1761 may use point-to-point transmission to deliver and convey PDUs. In this regard, the RAN node 1111 may comprise L2 and L1 layer communication links (e.g., wired or wireless) with the MME/AMF to exchange information.

In a second example, a user plane protocol stack may comprise, in order from highest layer to lowest layer, SDAP 1747, PDCP 1740, RLC 1730, MAC 1720, and PHY 1710.

The user plane protocol stack may be used for communication between the UE 1101, the RAN node 1111, and UPF 1302 in NR implementations or an S-GW 1222 and P-GW 1223 in LTE implementations. In this example, upper layers 1751 may be built on top of the SDAP 1747, and may include a user datagram protocol (UDP) and IP security layer (UDP/IP) 1752, a General Packet Radio Service (GPRS) Tunneling Protocol for the user plane layer (GTP-U) 1753, and a User Plane PDU layer (UP PDU) 1763.

The transport network layer 1754 (also referred to as a "transport layer") may be built on IP transport, and the GTP-U 1753 may be used on top of the UDP/IP layer 1752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1753 may be used for carrying user data within the GPRS core network and between the radio access network and the core network. The user data transported can be packets in any of IPv4, IPv6, or PPP formats, for example. The UDP/IP 1752 may provide checksums for data integrity, port numbers for addressing different functions at the source and destination, and encryption and authentication on the selected data flows. The RAN node 1111 and the S-GW 1222 may utilize an S1-U interface to exchange user plane data via a protocol stack comprising an L1 layer (e.g., PHY 1710), an L2 layer (e.g., MAC 1720, RLC 1730, PDCP 1740, and/or SDAP 1747), the UDP/IP layer 1752, and the GTP-U 1753. The S-GW 1222 and the P-GW 1223 may utilize an S5/S8a interface to exchange user plane data via a protocol stack comprising an L1 layer, an L2 layer, the UDP/IP layer 1752, and the GTP-U 1753. As discussed previously, NAS protocols may support the mobility of the UE 1101 and the session management procedures to establish and maintain IP connectivity between the UE 1101 and the P-GW 1223.

Moreover, although not shown by FIG. 17, an application layer may be present above the AP 1763 and/or the transport network layer 1754. The application layer may be a layer in which a user of the UE 1101, RAN node 1111, or other network element interacts with software applications being executed, for example, by application circuitry 1405 or application circuitry 1505, respectively. The application layer may also provide one or more interfaces for software applications to interact with communications systems of the UE 1101 or RAN node 1111, such as the baseband circuitry 1610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 18:
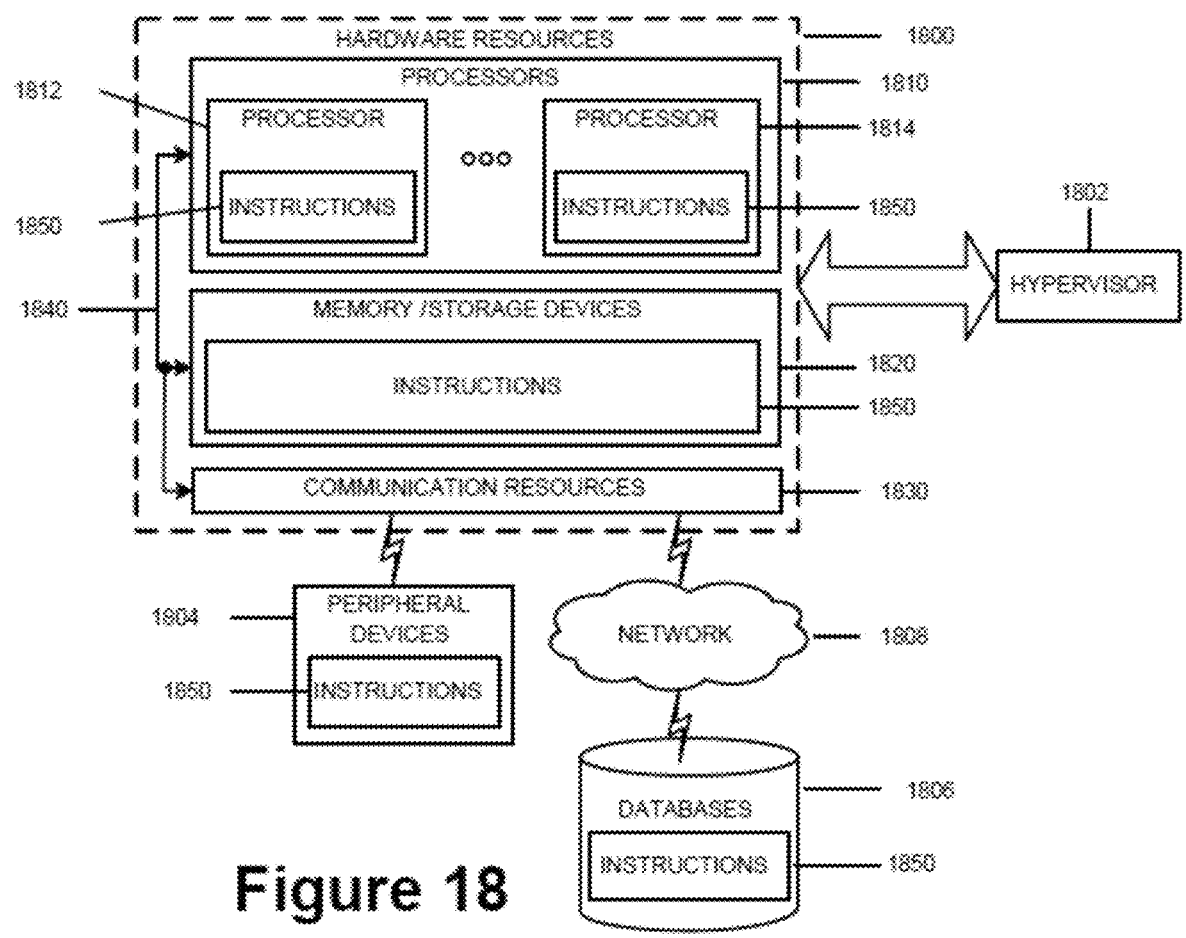
FIG. 18 is a block diagram illustrating components, according to some example embodiments, able to read instructions from a machine-readable or computer-readable medium (e.g., a non-transitory machine-readable storage medium) and perform any one or more of the methodologies discussed herein.

FIG. 18 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 18 shows a diagrammatic representation of hardware resources 1800 including one or more processors (or processor cores) 1810, one or more memory/storage devices 1820, and one or more communication resources 1830, each of which may be communicatively coupled via a bus 1840. For embodiments where node virtualization (e.g., NFV) is utilized, a hypervisor 1802 may be executed to provide an execution environment for one or more network slices/sub-slices to utilize the hardware resources 1800.

The processors 1810 may include, for example, a processor 1812 and a processor 1814. The processor(s) 1810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1820 may include main memory, disk storage, or any suitable combination thereof. The memory/storage devices 1820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1830 may include interconnection or network interface components or other suitable devices to communicate with one or more peripheral devices 1804 or one or more databases 1806 via a network 1808. For example, the communication resources 1830 may include wired communication components (e.g., for coupling via USB), cellular communication components, NFC components, Bluetooth® (or Bluetooth® Low Energy) components, Wi-Fi® components, and other communication components.

Instructions 1850 may comprise software, a program, an application, an applet, an app, or other executable code for causing at least any of the processors 1810 to perform any one or more of the methodologies discussed herein. The instructions 1850 may reside, completely or partially, within at least one of the processors 1810 (e.g., within the processor's cache memory), the memory/storage devices 1820, or any suitable combination thereof. Furthermore, any portion of the instructions 1850 may be transferred to the hardware resources 1800 from any combination of the peripheral devices 1804 or the databases 1806. Accordingly, the memory of processors 1810, the memory/storage devices 1820, the peripheral devices 1804, and the databases 1806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the method of NR DL PRS resource scheduling is comprising of: configuring an NR DL PRS Resource Pool; configuring an NR DL PRS Resource Set; configuring an NR DL PRS Resource; or configuring muting patterns.

Example 2 may include the method of example 1 or some other example herein, wherein the configured NR DL PRS Resource Set is assigned to a separate TRP.

Example 3 may include the method of example 1 or some other example herein, wherein a list of configured NR DL PRS Resource Sets is assigned to a separate TRP.

Example 4 may include the method of example 3 or some other example herein, wherein the assigned NR DL PRS Resource Set includes PRS Resources with different spatial filters (Tx beams).

Example 5 may include the method of example 3 or some other example herein, wherein the assigned NR DL PRS Resource Set includes PRS Resources with the same spatial filter (Tx beams).

Example 6 may include the method of example 3 or some other example herein, wherein the assigned each PRS Resource Set from list of NR DL PRS Resource Sets includes PRS Resources with same spatial filter configuration (Tx beam), the spatial filter configuration (Tx beam) between different PRS Resource Sets is different.

Example 7 may include the method of example 3 or some other example herein, wherein the assigned each PRS Resource Set from list of NR DL PRS Resource Sets includes PRS Resources with different spatial filter configuration (Tx beam), the spatial filter configuration (Tx beam) between different PRS Resource Sets is same.

Example 8 may include the method of example 1 or some other example herein, wherein the muting procedure is configured per one or a combination of following options: Intra-Resource level; PRS Resource level; PRS Resource Set level; TRP level; or PRS Resource Pool level.

Example 9 may include the method of example 8 or some other example herein, wherein the intra-Resource level muting is configure, the activation and deactivation of PRS transmission on part of time/frequency resources inside the single PRS Resource is based on muting procedure.

Example 10 may include the method of example 8 or some other example herein, wherein the PRS Resource level muting is configured, the activation and deactivation of PRS transmission on separate PRS Resource inside of the PRS Resource Set is based on muting procedure.

Example 11 may include the method of example 8 or some other example herein, wherein the PRS Resource Set level muting is configured, the activation and deactivation of PRS transmission on separate PRS Resource Set inside of the list of PRS Resource Sets configured on a TRP is based on muting procedure.

Example 12 may include the method of example 8 or some other example herein, wherein the TRP level muting is configured, the activation and deactivation of PRS transmission from separate TRP is based on muting procedure.

Example 13 may include the method of example 8 or some other example herein, wherein the PRS Resource Pool level muting is configured, the activation and deactivation of PRS transmission on separate PRS Resource Pool is based on muting procedure.

Example 14 may include the method of example 1 or some other example herein, performing a muting procedure with a pattern-based mechanism for selection of active DL PRS Resources for PRS transmission.

Example 15 may include the method of example 14 or some other example herein, wherein the pattern based muting procedure is configured in a predefined mode, where the re-configuration of pattern structure is not allowed during the positioning operation.

Example 16 may include the method of example 14 or some other example herein, wherein the pattern based muting procedure is configured in a dynamic mode, where the re-configuration of pattern structure is allowed during the positioning operation.

Example 17 may include the method of example 16 or some other example herein, wherein the dynamic re-configuration of muting pattern is enabled one or a combination of following options are used for muting pattern dynamic re-configuration: selection of a single muting pattern from a list of pre-configured muting patterns; or dynamic reconfiguration of single defined muting pattern based on equation/formula/rule.

Example 18 may include the method of example 17 or some other example herein, wherein the dynamic re-configuration of muting pattern is based on selection of a single muting pattern from a list of pre-configured muting patterns, the list of muting patterns is defined for each TRP separately.

Example 19 may include the method of example 18 or some other example herein, wherein the single muting pattern is selected from a list of pre-configured muting patterns, the index of the selected muting pattern is defined according to following options: random selection across all predefined set of patterns; or subsequent selection of set elements.

Example 20 may include the method of example 17 or some other example herein, wherein the dynamic re-configuration of muting pattern is based on single defined muting pattern re-configuration based on equation/formula/rule which can be based on one or a combination of following options: cyclic shift operation of the defined pattern; or selection of K elements from N-element pattern array, where N—muting pattern size and K—number of non-zero elements in the muting pattern.

Example 21 may include the method of example 20 or some other example herein, wherein the cyclic shift operation is defined as a re-configuration rule for the muting patter, where the pattern for muting is calculated by applying of cyclic shift operation for the defined muting pattern.

Example 22 may include the method of example 21 or some other example herein, wherein the cyclic shift is calculated according to one or a combination of following options: random cyclic shift determination; predefined list of cyclic offsets for each TRP; equation based, which depends on TRP specific parameters, for example, following equation can be used for cyclic shift calculation: $cs=\lfloor PreiodId/N_{cs}\rfloor$, where cs–TRP specific cyclic shift, PreiodId–PRS period ID, N_cs–TRP specific parameter dedicated for cyclic shift configuration.

Example 23 may include the method of example 20 or some other example herein, wherein the selection procedure of K elements rom N-element pattern is a procedure which can use one or a combination of following approaches: random selection procedure; or selection based on pre-defined rule.

Example 24 may include the method of example 23 or some other example herein, wherein the predefined rule for dynamic re-configuration of muting pattern is defined as a fixed equation which is based on common PRS Pool parameters, time counter and TRP specific positioning parameters.

Example 25 may include the method of example 1 or some other example herein, wherein the NR configuration of DL PRS Resource Set are defined, which includes Tx beamforming configuration procedure.

Example 26 may include the method of example 25 or some other example herein, wherein the NR Tx beam configuration is defined, which is configured for at least following options: PRS Resources from NR DL PRS Resource Set include different spatial filter (Tx beams); PRS Resources from NR DL PRS Resource Set includes the same spatial filter (Tx beams).

Example 27 may include the method of example 25 or some other example herein, wherein the NR Tx beam configuration is defined, where the calculation formula of Tx Beam ID for each Resource from the Resource Set depends on one or a combination of following parameters: Physical DL PRS Resource ID; DL PRS Period; DL PRS Resource Set ID; or Number of DL PRS Resources per Set or number of Tx beams.

As an example of the calculation formula, following equation can be used for determination of Tx Beam Id for each Resource from Resource Set:

$$Tx\ beam\ Id=mod(PhyResID+PeriodID\cdot mod(PhySetID,BeamNum),BeamNum)),\ where$$

PhyResID—Physical DL PRS Resource ID;
PhySetID—Physical DL PRS Resource Set ID
BeamNum—Number of DL PRS Resources per Set or number of beams Example 28 may include the method of example 1 or some other example herein, wherein the NR DL PRS Resource is configured, the PRS Resource configuration includes at least following fields: resource element mapping pattern; or PRS sequence.

Example 29 may include the method of example 28 or some other example herein, wherein the PRS sequence is a configuration filed of NR DL PRS Resource, which is generated based on Gold Sequence generator using of initialized seed.

Example 30 may include the method of example 29 or some other example herein, wherein the initialized seed is used for PRS sequence generation, which is generated separately for each PRS Resource inside of the single PRS Resource Set, thus each PRS Resource has different PRS Sequence.

Example 31 may include the method of example 29 or some other example herein, wherein the initialized seed is used for PRS sequence generation, which is generated commonly for all PRS Resources inside of the PRS Resource Set, thus each PRS Resource has same PRS Sequence.

Example 32 may include the method of example 28 or some other example herein, wherein the resource element mapping pattern is a configuration filed of NR DL PRS Resource, which is generated as a consecutive combination of symbols each of which includes frequency shifted comb-N frequency patterns.

Example 33 may include the method of example 28 or some other example herein, wherein the resource element mapping pattern is a configuration filed of NR DL PRS Resource, which has following configuration options: Full staggered resource mapping pattern, where each subcarrier in the allocated bandwidth is occupied by PRS; or half staggered resource mapping pattern, where each odd or even subcarrier in the allocated bandwidth are occupied by PRS.

Example 41 may include an apparatus comprising means to perform one or more elements of a method described in or related to any of examples 1-33, or any other method or process described herein.

Example 42 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 43 may include an apparatus comprising logic, modules, or circuitry to perform one or more elements of a method described in or related to any of examples 1-33, or any other method or process described herein.

Example 44 may include a method, technique, or process as described in or related to any of examples 1-33, or portions or parts thereof.

Example 45 may include an apparatus comprising: one or more processors and one or more computer-readable media comprising instructions that, when executed by the one or more processors, cause the one or more processors to perform the method, techniques, or process as described in or related to any of examples 1-33, or portions thereof.

Example 46 may include a signal as described in or related to any of examples 1-33, or portions or parts thereof.

Example 47 may include a datagram, packet, frame, segment, protocol data unit (PDU), or message as described in or related to any of examples 1-33, or portions or parts thereof, or otherwise described in the present disclosure.

Example 48 may include a signal encoded with data as described in or related to any of examples 1-33, or portions or parts thereof, or otherwise described in the present disclosure.

Example 49 may include a signal encoded with a datagram, packet, frame, segment, protocol data unit (PDU), or message as described in or related to any of examples 1-33, or portions or parts thereof, or otherwise described in the present disclosure.

Example 50 may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Example 51 may include a computer program comprising instructions, wherein execution of the program by a processing element is to cause the processing element to carry out the method, techniques, or process as described in or related to any of examples 1-33, or portions thereof.

Example 52 may include a signal in a wireless network as shown and described herein.

Example 53 may include a method of communicating in a wireless network as shown and described herein.

Example 54 may include a system for providing wireless communication as shown and described herein.

Example 55 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

ABBREVIATIONS

For the purposes of the present document, the following abbreviations may apply to the examples and embodiments discussed herein.
3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sisterna (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Spécial Mobile
GTP GPRS Tunneling Protocol
GTP-U GPRS Tunneling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V21 Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power

TERMINOLOGY

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that includes content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. A non-transitory machine-readable medium having executable instructions to cause one or more processing units to perform a method to a new radio (NR) downlink (DL) positioning reference signal (PRS) resource scheduling, the method comprising:
configuring at least one of a NR DL PRS Resource Pool, a NR DL PRS Resource Set, a NR DL PRS Resource, and a muting pattern; and
determining a PRS Resource identifier using the muting pattern that corresponds to the NR DL PRS Resource Set for the PRS Resource Set identifier, wherein the NR DL PRS Resource Set comprises a plurality of PRS Resources, a first subset of the plurality of PRS Resources in the NR DL PRS Resource Set are deactivated based on the muting pattern, and a second subset of the plurality of plurality of PRS Resources in the NR DL PRS Resource Set are activated based on the muting pattern.

2. The non-transitory machine-readable medium of claim 1, wherein the configured NR DL PRS Resource Set is assigned to a separate Transmission Reception Point (TRP).

3. The non-transitory machine-readable medium of claim 1, wherein a list of configured NR DL PRS Resource Sets is assigned to a separate TRP.

4. The non-transitory machine-readable medium of claim 3, wherein the assigned NR DL PRS Resource Set includes PRS Resources with different spatial filters.

5. The non-transitory machine-readable medium of claim 3, wherein the assigned NR DL PRS Resource Set includes PRS Resources with a same spatial filter.

6. The non-transitory machine-readable medium of claim 3, wherein each of the assigned PRS Resource Set from a list of NR DL PRS Resource Sets includes PRS Resources with same spatial filter configuration and the spatial filter configuration between different PRS Resource Sets is different.

7. The non-transitory machine-readable medium of claim 3, wherein each of the assigned each PRS Resource Set from a list of NR DL PRS Resource Sets includes PRS Resources with different spatial filter configuration and the spatial filter configuration between different PRS Resource Sets is the same.

8. The non-transitory machine-readable medium of claim 1, wherein a muting procedure is configured per one or a combination of the following options: Intra-Resource level; PRS Resource level; PRS Resource Set level; TRP level; or PRS Resource Pool level.

9. The non-transitory machine-readable medium of claim 1, wherein the method further comprises:
performing a muting procedure with a pattern-based mechanism for selection of active DL PRS Resources for PRS transmission.

10. The non-transitory machine-readable medium of claim 1, wherein the NR configuration of DL PRS Resource Set is defined and includes a transmit beamforming configuration procedure.

11. The non-transitory machine-readable medium of claim 1, wherein one of the plurality of PRS Resources is further divisible into multiple subparts and the muting pattern can independently activate/deactivate these subparts.

12. A method to new radio (NR) downlink (DL) positioning reference signal (PRS) resource scheduling comprising:
configuring at least one of a NR DL PRS Resource Pool, a NR DL PRS Resource Set, a NR DL PRS Resource, and a muting pattern; and
determining a PRS Resource identifier using the muting pattern that corresponds to the NR DL PRS Resource Set for the PRS Resource Set identifier, wherein the NR DL PRS Resource Set comprises a plurality of PRS Resources, a first subset of the plurality of PRS Resources in the NR DL PRS Resource Set are deactivated based on the muting pattern, and a second subset of the plurality of plurality of PRS Resources in the NR DL PRS Resource Set are activated based on the muting pattern.

13. The method of claim 12, wherein the configured NR DL PRS Resource Set is assigned to a separate Transmission Reception Point (TRP).

14. The method of claim 12, wherein a list of configured NR DL PRS Resource Sets is assigned to a separate TRP.

15. The method of claim 14, wherein the assigned NR DL PRS Resource Set includes PRS Resources with different spatial filters.

16. The method of claim 14, wherein the assigned NR DL PRS Resource Set includes PRS Resources with a same spatial filter.

17. The method of claim 14, wherein the assigned each PRS Resource Set from a list of NR DL PRS Resource Sets includes PRS Resources with same spatial filter configuration and the spatial filter configuration between different PRS Resource Sets is different.

18. The method of claim 14, wherein the assigned each PRS Resource Set from a list of NR DL PRS Resource Sets includes PRS Resources with different spatial filter configuration and the spatial filter configuration between different PRS Resource Sets is the same.

19. The method of claim 12, wherein a muting procedure is configured per one or a combination of the following options: Intra-Resource level; PRS Resource level; PRS Resource Set level; TRP level; or PRS Resource Pool level.

20. The method of claim 12, further comprising:
performing a muting procedure with a pattern-based mechanism for selection of active DL PRS Resources for PRS transmission.

21. The method of claim 12, wherein the NR configuration of DL PRS Resource Set are defined, which includes a Tx beamforming configuration procedure.

22. The method of claim 12, wherein one of the plurality of PRS Resources is further divisible into multiple subparts and the muting pattern can independently activate/deactivate these subparts.

* * * * *